(12) United States Patent
Ehrhart

(10) Patent No.: US 9,741,078 B2
(45) Date of Patent: Aug. 22, 2017

(54) DASHBOARD INTERFACE, PLATFORM, AND ENVIRONMENT FOR AUTOMATED NEGOTIATION, BENCHMARKING, COMPLIANCE, AND AUDITING

(71) Applicant: AON SINGAPORE CENTRE FOR INNOVATION STRATEGY AND MANAGEMENT PTE., LTD., Singapore (SG)

(72) Inventor: Bryon Gerard Ehrhart, Chicago, IL (US)

(73) Assignee: AON SINGAPORE CENTRE FOR INNOVATION, STRATEGY AND MANAGEMENT PTE., LTD., Singapore (SG)

( * ) Notice: Subject to any disclaimer, the term of this patent is extended or adjusted under 35 U.S.C. 154(b) by 0 days.

(21) Appl. No.: 15/198,797

(22) Filed: Jun. 30, 2016

(65) Prior Publication Data
US 2017/0161838 A1    Jun. 8, 2017

Related U.S. Application Data

(60) Provisional application No. 62/262,880, filed on Dec. 3, 2015.

(51) Int. Cl.
| G06Q 40/00 | (2012.01) |
| G06Q 40/08 | (2012.01) |
| G06Q 40/04 | (2012.01) |
| G06F 3/0482 | (2013.01) |
| G06F 17/24 | (2006.01) |

(52) U.S. Cl.
CPC .......... *G06Q 40/08* (2013.01); *G06F 3/0482* (2013.01); *G06F 17/248* (2013.01); *G06Q 40/04* (2013.01)

(58) Field of Classification Search
CPC ........ G06Q 10/00; G06Q 20/00; G06Q 30/00; G06Q 40/00
USPC ...................................... 705/3–44
See application file for complete search history.

(56) References Cited

U.S. PATENT DOCUMENTS

| 6,807,635 | B1 * | 10/2004 | Kleckner | ............... | G06Q 40/04 380/228 |
| 7,130,823 | B1 * | 10/2006 | Rayner | .................. | G06Q 40/00 705/35 |
| 7,599,860 | B2 * | 10/2009 | Bird | ..................... | G06Q 20/204 705/26.5 |

(Continued)

*Primary Examiner* — Frantzy Poinvil
(74) *Attorney, Agent, or Firm* — Gardella Grace P.A.

(57) ABSTRACT

The present application describes dashboard user interfaces, methods, systems, and transactional environments for automated reinsurance negotiation, benchmarking, compliance, and auditing. During the automated process, in some embodiments, a quote template engine aids the user in customizing quote requests and follow-on quote information based upon learned parameters used in past negotiations, a real-time notification engine alerts parties to the negotiation when new information is available and/or automatically presents updating information for user review, and an audit trail management engine tracks information shared during the negotiation and stores the steps of the negotiation for later audit review. Further, a data mining engine may analyze the audit trail information to identify negotiation metrics related to the parties participating in the transactional environment.

13 Claims, 23 Drawing Sheets

(56) References Cited

U.S. PATENT DOCUMENTS

| | | | | |
|---|---|---|---|---|
| 8,301,544 | B2* | 10/2012 | Chatter | G06Q 30/0206 |
| | | | | 705/37 |
| 8,739,030 | B2* | 5/2014 | Ahuja | G06F 17/30893 |
| | | | | 715/200 |
| 9,025,938 | B2* | 5/2015 | Roberts, Jr. | G11B 27/323 |
| | | | | 386/280 |
| 2001/0042936 | A1* | 11/2001 | Kessel | A61K 9/2018 |
| | | | | 264/141 |
| 2003/0033212 | A1* | 2/2003 | Sandhu | G06Q 30/0601 |
| | | | | 705/26.1 |
| 2005/0256797 | A1* | 11/2005 | Tyulyaev | G06Q 40/06 |
| | | | | 705/37 |
| 2011/0151831 | A1* | 6/2011 | Pattabiraman | H04L 12/14 |
| | | | | 455/405 |
| 2012/0215711 | A1* | 8/2012 | Brief | G06Q 10/06311 |
| | | | | 705/321 |
| 2015/0269628 | A1* | 9/2015 | Urtso | G06Q 30/0269 |
| | | | | 705/14.66 |

* cited by examiner

FIG. 3A

| Quote ContractSectionID | Editable | FieldName | DataType | Quote ContractSection | Displayed 608 |
|---|---|---|---|---|---|
| 400040030 | TRUE | OccurrenceLimit | Money | 115000 | 115000 |
| 400040030 | TRUE | PerPersonLimit | Money | 20000 | 20000 |
| 400040030 | | ValidateBusinessSegmentID | Char | 9 | Workers Co |
| 400040030 | | BrokerageRate | Float | 2.50% | 2.50% |
| 400040030 | | MarginDollars | Money | 55000 | 55000 |
| 400040030 | | ThruDate | DateTime | 12/31/2015 | 12/31/2015 |
| 400040031 | TRUE | OccurrenceLimit | Money | | |
| 400040031 | TRUE | PerPersonLimit | Money | | |
| 400040031 | | ValidateBusinessSegmentID | Char | 9 | Workers Co |
| 400040031 | | BrokerageRate | Float | 2.50% | 2.50% |
| 400040031 | | MarginDollars | Money | 10000 | 10000 |
| 400040031 | | ThruDate | DateTime | 12/31/2015 | 12/31/2015 |

FIG. 6A

| Quote ContractSectionID | Editable | FieldName | DataType | Quote ContractSection | Quote A Not Submitted | 612 |
|---|---|---|---|---|---|---|
| 400040030 | TRUE | OccurrenceLimit | Money | 115000 | | 125000 ⌐612a |
| 400040030 | TRUE | PerPersonLimit | Money | 20000 | | 25000 ⌐612b |
| 400040030 | | ValidateBusinessSegmentID | Char | 9 | | |
| 400040030 | | BrokerageRate | Float | 2.50% | | |
| 400040030 | | MarginDollars | Money | 55000 | | |
| 400040030 | | ThruDate | DateTime | 12/31/2015 | | |
| 400040031 | TRUE | OccurrenceLimit | Money | | | 12500 ⌐612c |
| 400040031 | TRUE | PerPersonLimit | Money | | | ⌐612d |
| 400040031 | | ValidateBusinessSegmentID | Char | 9 | | |
| 400040031 | | BrokerageRate | Float | 2.50% | | |
| 400040031 | | MarginDollars | Money | 10000 | | |
| 400040031 | | ThruDate | DateTime | 12/31/2015 | | |

| Quote ContractSectionID | Editable | FieldName | DataType | Quote ContractSection | Quote A Not Submitted |
|---|---|---|---|---|---|
| 400040030 | TRUE | OccurrenceLimit | Money | 115000 | 125000 ⌐ 612a |
| 400040030 | TRUE | PerPersonLimit | Money | 20000 | 25000 ⌐ 612b |
| 400040030 | | ValidateBusinessSegmentID | Char | 9 | |
| 400040030 | | BrokerageRate | Float | 2.50% | |
| 400040030 | | MarginDollars | Money | 55000 | |
| 400040030 | | ThruDate | DateTime | 12/31/2015 | |
| 400040031 | TRUE | OccurrenceLimit | Money | | 12500 ⌐ 612c |
| 400040031 | TRUE | PerPersonLimit | Money | | 5000 ⌐ 612d |
| 400040031 | | ValidateBusinessSegmentID | Char | 9 | |
| 400040031 | | BrokerageRate | Float | 2.50% | |
| 400040031 | | MarginDollars | Money | 10000 | |
| 400040031 | | ThruDate | DateTime | 12/31/2015 | |

| Quote ContractSectionID | Editable | FieldName | DataType | Quote ContractSection | Quote A Submitted | Displayed |
|---|---|---|---|---|---|---|
| 400040030 | TRUE | OccurrenceLimit | Money | 115000 | 125000 | 125000 — 612a |
| 400040030 | TRUE | PerPersonLimit | Money | 20000 | 25000 | 25000 — 612b |
| 400040030 | | ValidateBusinessSegmentID | Char | 9 | | Workers Co |
| 400040030 | | BrokerageRate | Float | 2.50% | | 2.50% |
| 400040030 | | MarginDollars | Money | 55000 | | 55000 |
| 400040030 | | ThruDate | DateTime | 12/31/2015 | | 12/31/2015 |
| 400040031 | TRUE | OccurrenceLimit | Money | | 12500 | 12500 — 612c |
| 400040031 | TRUE | PerPersonLimit | Money | | 5000 | 5000 — 612d |
| 400040031 | | ValidateBusinessSegmentID | Char | 9 | | Workers Co |
| 400040031 | | BrokerageRate | Float | 2.50% | | 2.50% |
| 400040031 | | MarginDollars | Money | 10000 | | 10000 |
| 400040031 | | ThruDate | DateTime | 12/31/2015 | | 12/31/2015 |
| 400040032 | TRUE | OccurrenceLimit | Money | | | |
| 400040032 | TRUE | PerPersonLimit | Money | | | |
| 400040032 | | ValidateBusinessSegmentID | Char | 9 | | Workers Co |
| 400040032 | | BrokerageRate | Float | 2.50% | | 2.50% |
| 400040032 | | MarginDollars | Money | 0 | | 0 |
| 400040032 | | ThruDate | DateTime | 12/31/2015 | | 12/31/2015 |

FIG. 6D

| Quote ContractSectionID | Editable | FieldName | DataType | Quote ContractSection | Quote A Submitted | Quote B Submitted | Displayed |
|---|---|---|---|---|---|---|---|
| 400040030 | TRUE | OccurrenceLimit | Money | 115000 | 125000 | | 125000 |
| 400040030 | TRUE | PerPersonLimit | Money | 20000 | 25000 | | 25000 |
| 400040030 | | ValidateBusinessSegmentID | Char | 9 | | | Workers Co |
| 400040030 | | BrokerageRate | Float | 2.50% | | | 2.50% |
| 400040030 | | MarginDollars | Money | 55000 | | | 55000 |
| 400040030 | | ThruDate | DateTime | 12/31/2015 | | | 12/31/2015 |
| 400040031 | TRUE | OccurrenceLimit | Money | | 12500 | | 12500 |
| 400040031 | TRUE | PerPersonLimit | Money | | 5000 | | 5000 |
| 400040031 | | ValidateBusinessSegmentID | Char | 9 | | | Workers Co |
| 400040031 | | BrokerageRate | Float | 2.50% | | | 2.50% |
| 400040031 | | MarginDollars | Money | 10000 | | | 10000 |
| 400040031 | | ThruDate | DateTime | 12/31/2015 | | | 12/31/2015 |
| 400040032 | TRUE | OccurrenceLimit | Money | | | 500000 | 500000 |
| 400040032 | TRUE | PerPersonLimit | Money | | | 150000 | 150000 |
| 400040032 | | ValidateBusinessSegmentID | Char | 9 | | | Workers Co |
| 400040032 | | BrokerageRate | Float | 2.50% | | | 2.50% |
| 400040032 | | MarginDollars | Money | 0 | | | 0 |
| 400040032 | | ThruDate | DateTime | 12/31/2015 | | | 12/31/2015 |

FIG. 6E

| | Authorization Confirmation 730 | | | |
|---|---|---|---|---|
| 720 | Authorize Response | Authorization Expiration | Subjectivity 740 | Comments 750 |
| Layer 1 710a | 15.000000% 720a | 3/10/2016 730a | Subjectivity 1 740a | |
| Layer 2 710b | 1.123452% | | Subjectivity 2 | Comments 1 750a |
| Layer 3 710c | 25.000000% | 3/10/2016 | | |
| Layer 4 710d | Declined 720b | | | Decline Comments 1 750b |

FIG. 7

DASHBOARD INTERFACE, PLATFORM, AND ENVIRONMENT FOR AUTOMATED NEGOTIATION, BENCHMARKING, COMPLIANCE, AND AUDITING

RELATED APPLICATIONS

The present application is related to and claims the priority of U.S. Provisional Patent Application Ser. No. 62/262,880 filed Dec. 3, 2015, which is hereby incorporated by reference in its entirety.

BACKGROUND

Insurance brokers act as intermediaries for their clients, which may be entities seeking insurance coverage for certain risks. Insurance brokers bring clients together with insurance providers (known as "insurance carriers") who may be willing and able to provide the desired insurance coverage on beneficial terms for the client.

Reinsurance negotiation practice involves discrete provision of quote request, modification, and acceptance or declination during a life cycle involving parameter adjustments, contract document additions, and other information handling that is largely manually entered and shared between parties to a negotiation. This process is slow, laborious, and prone to loss of information important to transaction auditing. Additionally, the process makes benchmarking of negotiation metrics cumbersome and difficult.

SUMMARY OF ILLUSTRATIVE EMBODIMENTS

The present application describes dashboard user interfaces, methods, systems, and transactional environments for automated transaction negotiation, benchmarking, compliance, and auditing. During the automated process, in some embodiments, a quote template engine aids the user (e.g., broker) in customizing quote requests and follow-on quote information based upon learned parameters used in past negotiations. For example, data derived from completed transactions may be used to automatically identify preferred quote parameters based upon product type, geography, vendor, customer, or other common parameters. A real-time notification engine may alert parties (e.g., clients, customers, brokers and/or vendors) to the negotiation when new information is available and/or automatically present updating information for user review. This allows faster exchange of information leading to prompt completion of transactions. Information, in another example, may be created once and selectively shared with multiple parties. For example, depending upon negotiation partner, a party to the negotiation may select to share certain standard contracts or other documents (e.g., product details, warranties, etc.) uploaded and securely stored in the negotiation environment. During negotiations, an audit trail management engine tracks information shared and stores the steps of the negotiation for later audit review. The audit trail may automatically support financial market compliance requirements such that parties are reassured as to compliance without needing to individually manage and store compliance documentation. Additionally, parties to the negotiation may have the ability to review modifications to the agreement throughout the course of the negotiation. Further, a data mining engine may analyze the audit trail information to identify negotiation metrics related to the parties participating in the transactional environment. The negotiation metrics may be presented in report format to gain greater understanding of vendor appetites, trends in pricing, transaction volume, and other information around the globe. The information may be presented based on a number of negotiation variables including, in some examples, product type, geography, market, vendor, and deal size.

BRIEF DESCRIPTION OF THE FIGURES

FIGS. 3A through 3F are example screen shots of a user interface for automated negotiation of reinsurance quotes;

FIGS. 6A through 6E are example quote development stages in negotiating a quote through a platform for automated transaction negotiation, benchmarking, compliance, and auditing;

FIG. 7 illustrates an example response received by a broker for a previously submitted quote;

DETAILED DESCRIPTION

Figure 1:
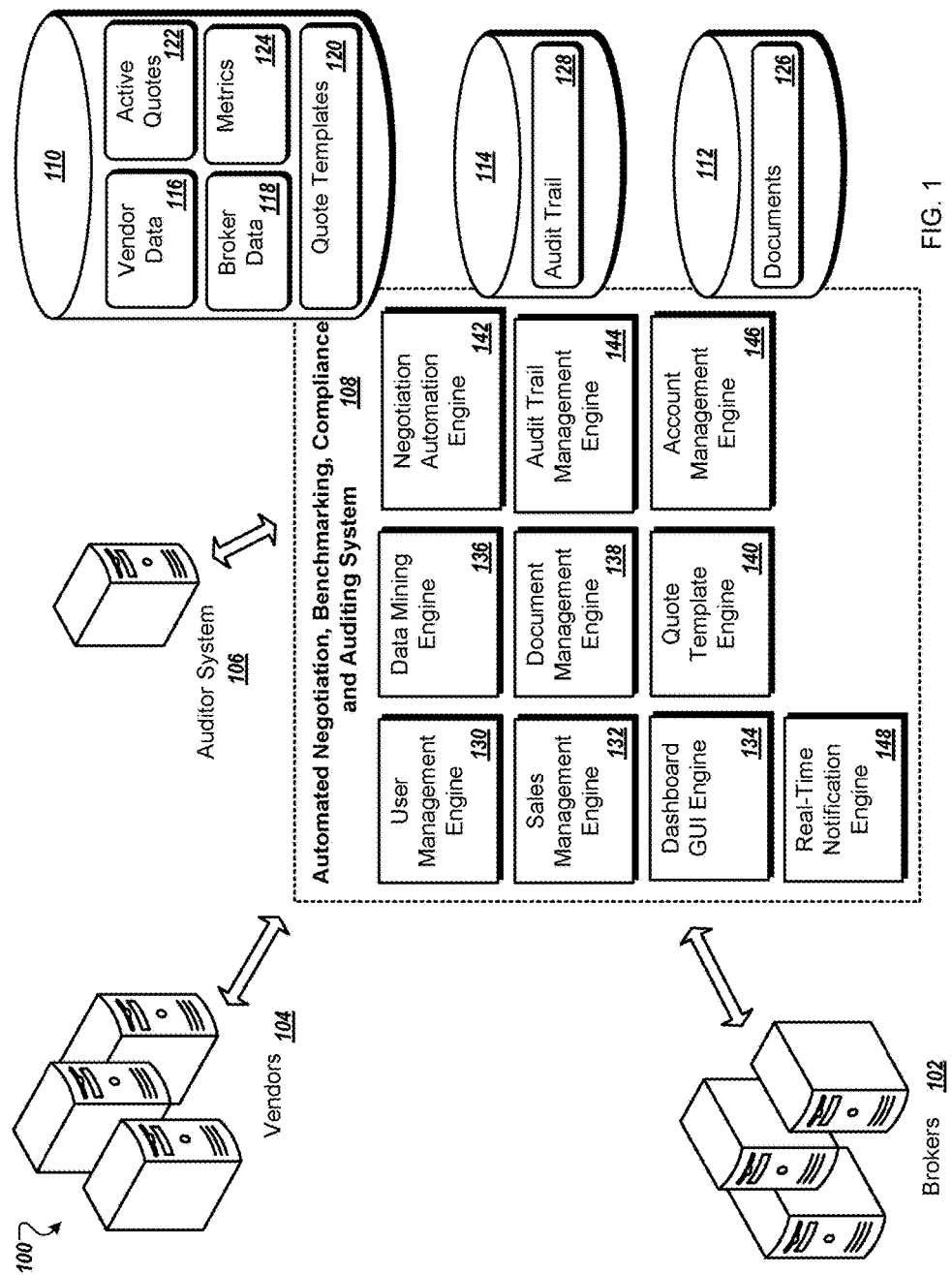
FIG. 1 is a block diagram of an example environment for automated transaction negotiation, benchmarking, compliance, and auditing.

The present disclosure describes a dashboard interface, methods, systems, platforms, and transactional environments for automated transaction negotiation, benchmarking, compliance, and auditing. The transaction, for example, may include reinsurance quote negotiation. Turning to FIG. 1, an example environment 100 includes a number of vendor (e.g., reinsurance carrier) computing systems 104, a number of broker computing systems 102 (e.g., individual computing devices, servers, and/or organizational computing systems), and at least one auditor computing system 106 in communication with a network-based system 108 providing a variety of software engines 130 through 148 for supporting a platform for automated transaction negotiation, benchmarking, compliance, and auditing. The system 108 manages transaction data in a transaction data repository 110, audit trail information in an audit trail repository 114, and transactional documents (e.g., contracts, agreements, etc. created and uploaded by the brokers 102 and/or vendors 104) in a document repository 112.

In some implementations, the system 108 authenticates users connecting through the vendor computing systems 104 and broker computing systems 102 through a user management engine 130. The user management engine 130, for example, may authenticate users and/or computing systems 102, 104 based upon information stored within broker data 118 and vendor data 116. In some examples, user passwords, valid computing system addresses, dashboard activity data, etc. may be maintained for individual reinsurers (via vendor data 116) and/or brokers (via broker data 118) connecting to the system 108.

A broker connected to the system 108, in some implementations, can prepare a reusable quote template, via a quote template engine 140, to request a transactional quote from one or more of the vendors represented by the vendor computing systems 104. The quote template engine 140, for example, may supply stock transactional data elements for selection in preparing a quote template specific to a particular customer, groups of customers, product type, market, geographic region, etc. The broker may store one or more quote templates 120 in the transactional data repository 110.

After preparing the quote template 120, the broker can select one or more vendors (e.g., reinsurance carriers) from the vendors managed by the user management engine 130 through a negotiation automation engine 142, and customize the quote template for the vendor(s). A dashboard GUI engine 134, in some embodiments, provides the broker computing systems 102 with an interface for quote template creation and negotiation management. The brokers, in some embodiments, may select individual reinsurers for quote preparation based upon reinsurer data 116 maintained in the transactional data repository 110. The reinsurer data 116, in some examples, may include information regarding markets, regions, risk appetite, etc. for each reinsurer within the environment 100.

In some implementations, when customizing the quote request, the broker includes a document 126. In some examples, the broker uploads a document, such as a contract agreement, via a document management engine 138. The document management engine 138 may store the uploaded document in the document repository 112. In some embodiments, an audit trail management engine 144 correlates the uploaded document 126 with the initiated transaction.

Upon submission of a quote request by the broker via the negotiation automation engine 142, in some implementations, an audit trail management engine 144 logs audit trail information 128 regarding the quote request in an audit trail repository 114. The audit trail management engine 144, for example, may track negotiation terms and shared documents throughout a transaction for future audit purposes (e.g., by the auditor computing system 106 and/or internally by the broker computing systems 102 and vendor computing systems 104).

After the broker submits the quote request, targeted reinsurers can access and review quote information prepared by an account management engine 146 and presented by the dashboard GUI engine 134. In another example, a real-time notification engine 148 may identify one or more recipients (e.g., individual users and/or users identified in a particular user group) for real-time notification regarding submission of the quote request. The real-time notification, in some examples, may include a mobile device app notification, a SMS message notification, an email notification, or an automated voice mail notification. The type of notification, in some embodiments, may be based in part upon user preferences managed by the user management engine 130. Further, if the reinsurer is reviewing information supplied by the system 108 presented by the dashboard GUI engine 134, in some embodiments, the dashboard GUI engine 134 may refresh the dashboard interface to supply real-time notification via the reinsurer dashboard.

The reinsurer, in some implementations, prepares a response to the quote request, for example via the dashboard GUI engine 134. The audit trail management engine 144 may track the response supplied by the reinsurer as part of the audit trail information 128 for this particular transaction. Further details regarding the negotiation process is provided in the following figures, below.

In some implementations, a data mining engine 136 statistically analyzes information regarding the various transactions supported by the system 108. The data mining engine 136 may compile terms of quotes from both accepted and declined quotes. Based on the terms and the accept/decline rates, the data mining engine 136 may generate metrics 124 associated with the terms of the quotes, which may be stored in the transaction data repository 110. In certain embodiments, the quote template engine 140 may provide recommendations to users in populating the quote template 120, for example based upon metrics 124 or other common features of past templates and/or stored templates (e.g., in audit trail data 128 or quote templates 120).

In some implementations, a sales management engine 132 generates management and underwriter level placement progress reports. A "quote analysis" report, in some embodiments, may present the brokers real-time statistics related to the outcomes of quotes, captured along the timeline from request to bind. For example, the dashboard GUI engine 134 may update the dashboard interface of the brokers to present a graphical analysis of vendor declination reasons. The dashboard may display detailed analysis of entity declination reasons and entity acceptance reasons. Further, the sales management engine 132 may present the brokers with an analysis of percentage submissions quoted by each of a number of vendors, such as the percentage submission-to-quote presented for each of the top five vendors. The top five reinsurance carriers, in some examples, may be identified as the top five performing vendors within the dashboard environment, the five vendors determined to be most similar to the present vendor, and/or the top five vendors for the type metrics presently presented, etc. The sales management engine 132 may allow the brokers, via the dashboard interface, to review percentages of quotes submitted based upon deductible type. Similarly, the brokers may review percentages of quotes submitted based upon deductible ranges.

Turning to a "product types and industry analysis" report, in some embodiments, the sales management engine 132 may provide statistics regarding product types offered via the dashboard environment and purchasing trends across industry sectors. The dashboard interface for the brokers may present top product types by aggregate premiums. Furthermore, the information may be filtered by geography and/or by industry sectors. Further, the analysis may be broken down to illustrate top reinsurers for each of top product types and/or top industry sectors.

In some implementations, the sales management engine 132 may provide reports relating to analysis of trade volume and aggregate premiums across reinsurance carriers participating in the dashboard environment. For example, the analysis report may include the aggregate numbers of trades by a reinsurance carrier over a given period of time. The report may additionally include identification of a bound premium associated with the aggregate trades. The bound trades statistics and aggregate premium statistics may further be filtered by geography and/or by industry. Additional filtering options and combinations are possible, such as reinsurance carriers by premium and by geography.

Figure 2A:
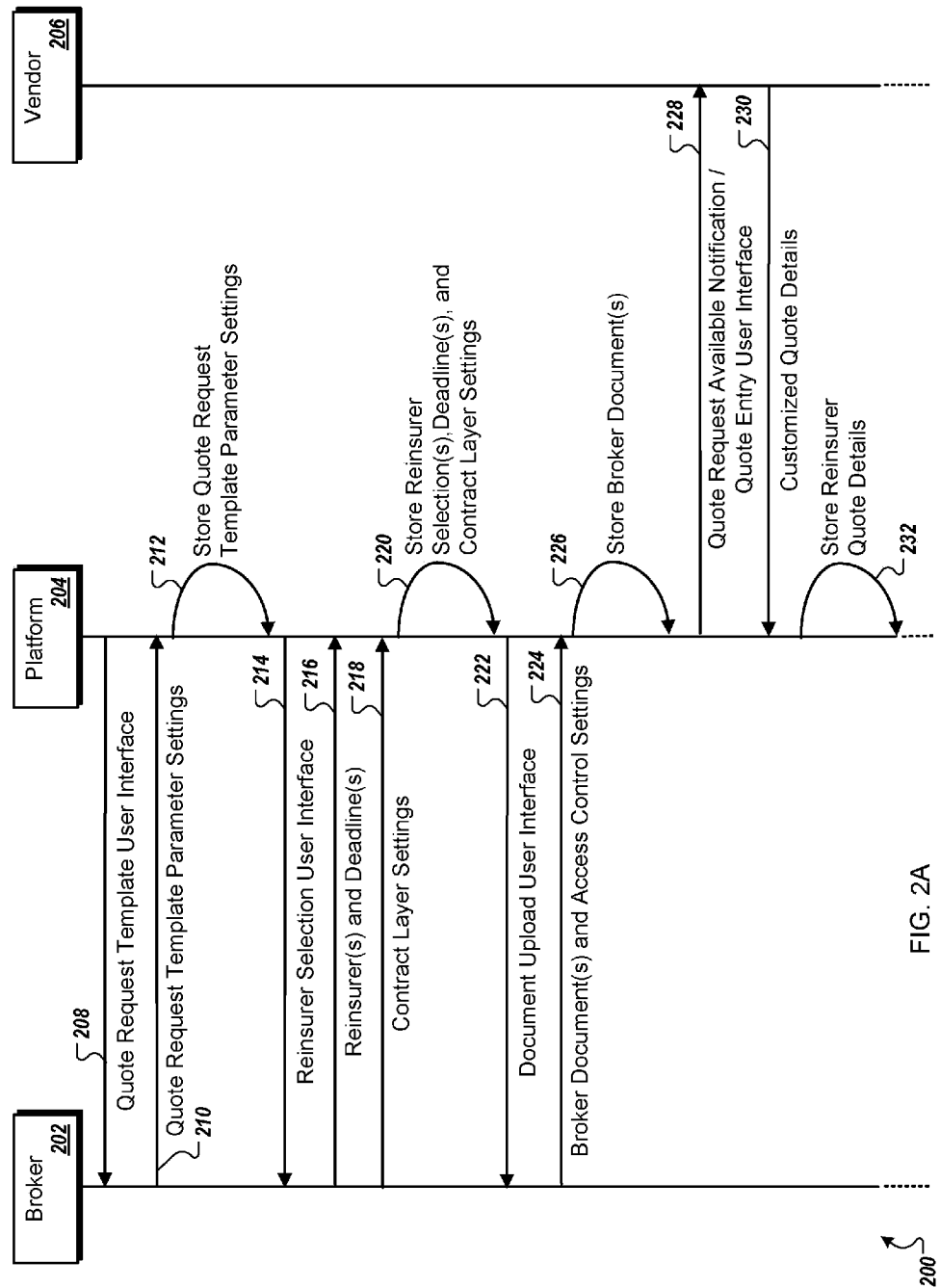
FIGS. 2A and 2B are a swim lane diagram illustrating an example method for negotiating a quote through a platform for automated transaction negotiation, benchmarking, compliance, and auditing.
Figure 2B:
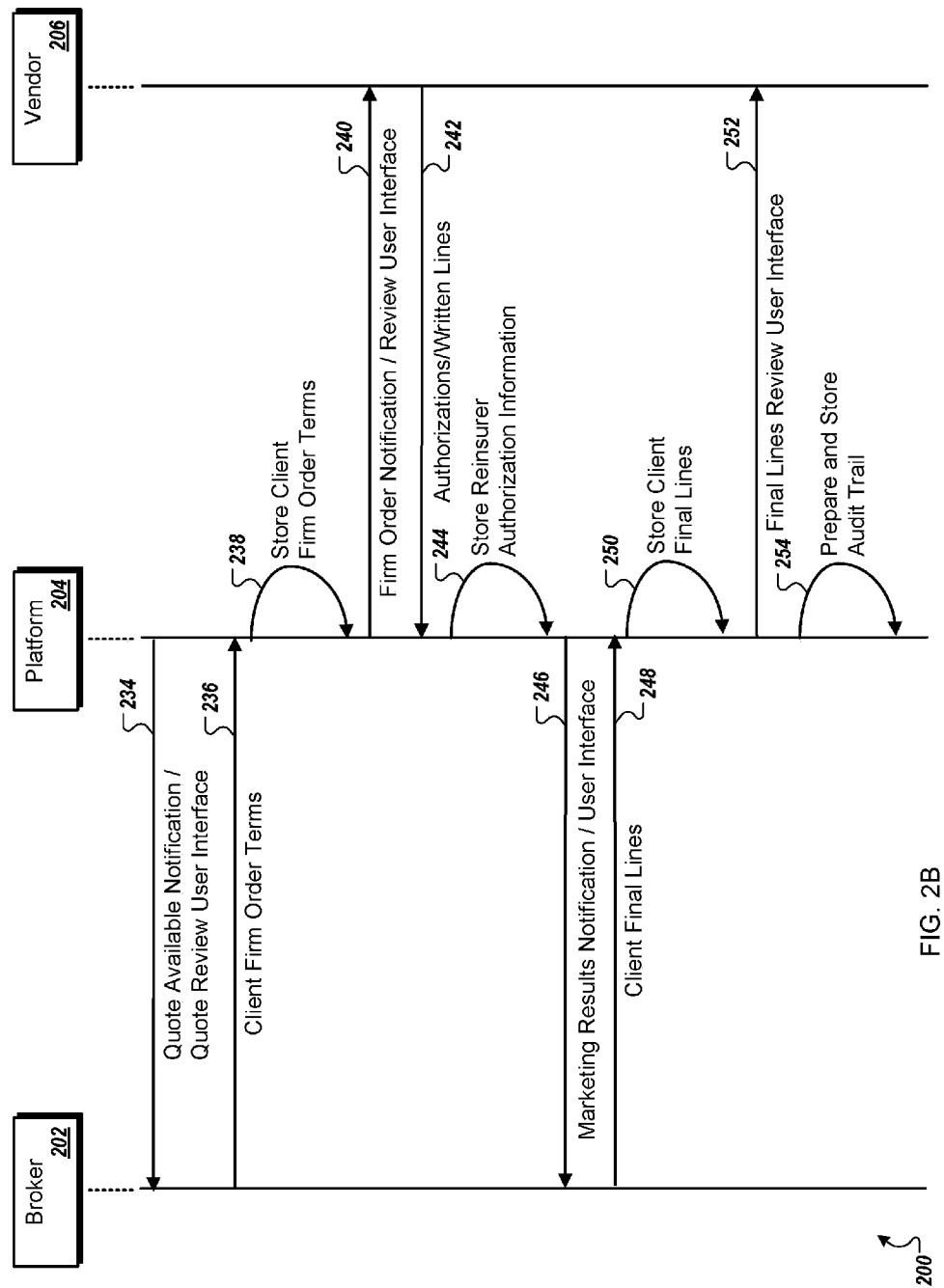

Turning to FIGS. 2A and 2B, a flow diagram illustrates communication flows between a broker 202, a platform 204, and a vendor 206 during an example transaction process 200. The transaction process 200, for example, may be supported by the environment 100 of FIG. 1, where the platform 204 represents the system 108, the broker 202 represents the broker computing systems 102, and the vendor 206 represents the vendor computing systems 104.

In some implementations, the transaction process 200 begins with the platform 204 supplying a quote request template user interface (208) to the broker 202. The quote request template user interface, for example, may be provided by the dashboard GUI engine 124 of FIG. 1. The quote request template may be based upon a number of selectable term options, product types, markets, geographical regions, and/or preferred vendors (e.g., quote variables).

Figure 5A:
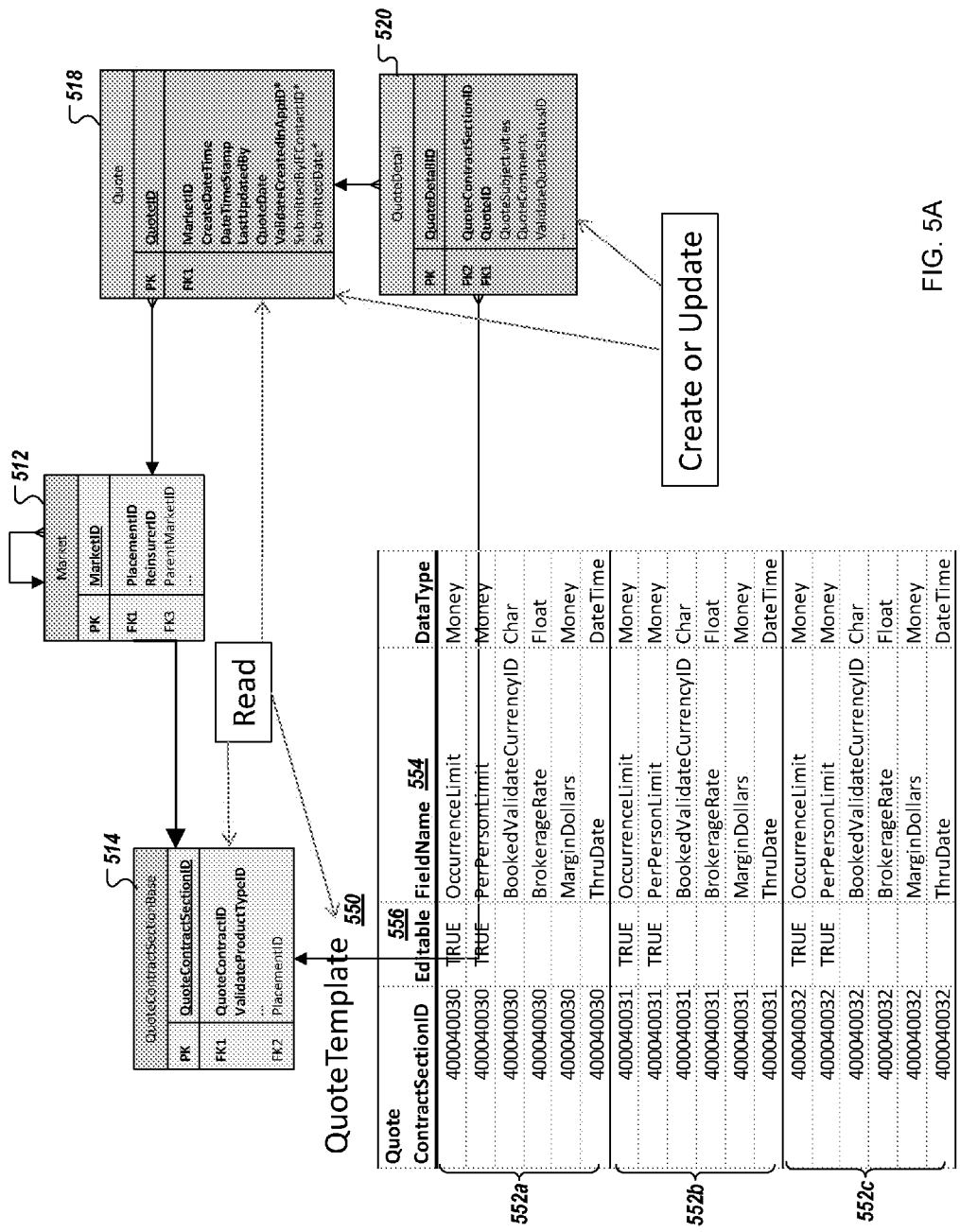
FIG. 5A illustrates an example quote template data field architecture.

Turning to FIG. 5A, in some implementations, the user builds a quote template 550. The quote template 550, as illustrated, includes a number of contract sections 552, each contract section 552 including a number of fields 554 (e.g., occurrence limit, per person limit, booked validate currency identifier, brokerage rate, margin dollars, and "thru" date for response deadline to the quote request). Certain terms, in some embodiments, (e.g., occurrence limit and per person limit, as illustrated) may be deemed editable 556 by the user when preparing the quote template. The editable field 556, when activated, may allow the negotiating party (e.g., vendor such as a reinsurer) to modify a proposed term presented by the initiating party (e.g., broker).

Returning to FIG. 2A, in some implementations, the broker 202 responds by providing one or more quote request template parameter settings (210) to the platform 204. The quote request template parameter settings, for example, may include those terms selected by the broker 202 in preparing the quote template, such as the quote template 550 described in relation to FIG. 5A.

Figure 5B:
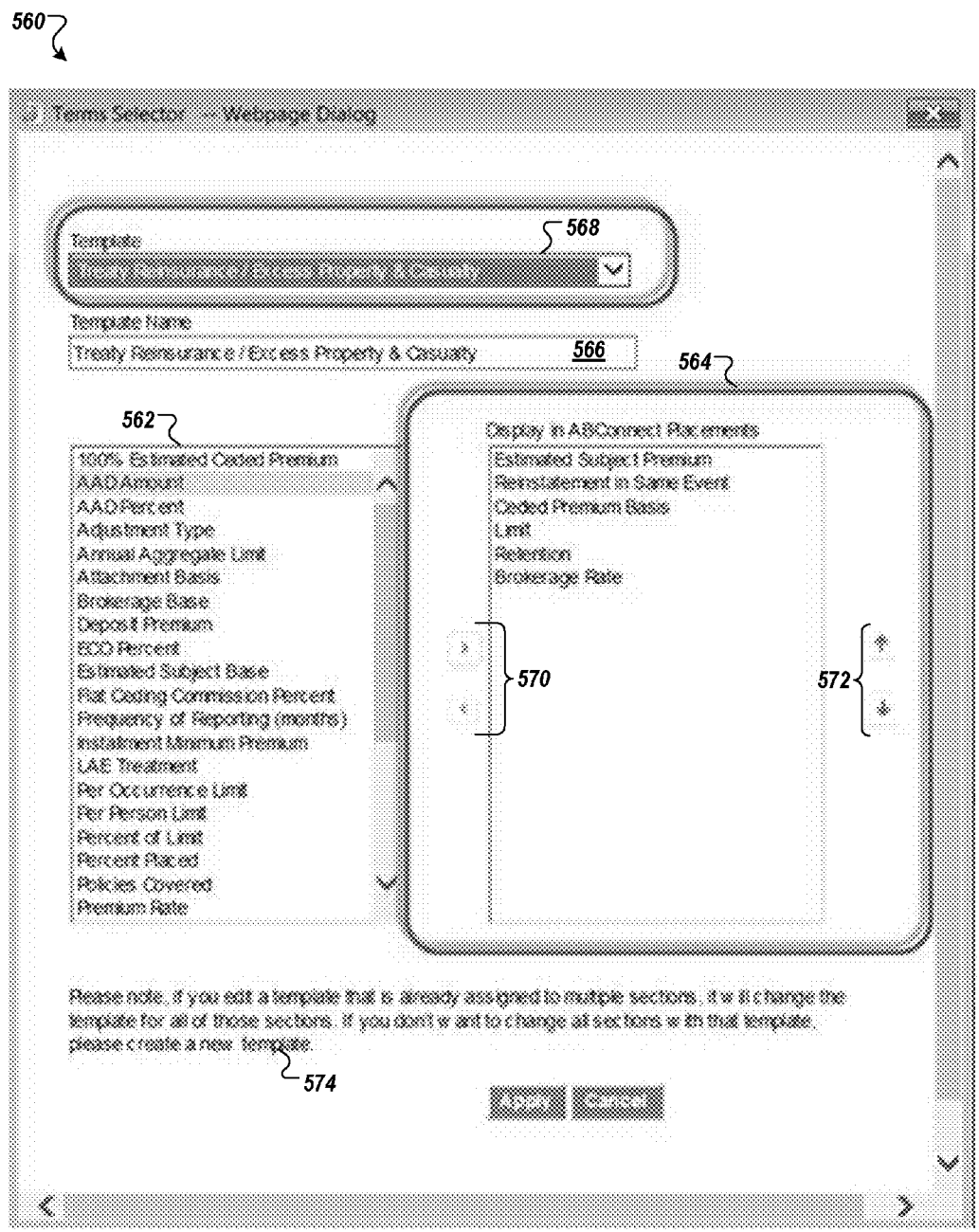
FIG. 5B illustrates an example quote template creation dialogue.

In some implementations, the broker 202 uses a quote customization user interface to provide the quote request template parameter setting(s). Turning to FIG. 5B, an example quote customization user interface 560 provides a mechanism for a user to select fields representing various template parameter settings. The user may enter the quote customization user interface 560, for example, from the quote edit user interface 330 of FIG. 3C. The user is presented with a menu containing available fields 562 from which to populate a second menu of selected template fields 564. The fields 562, for example, may be highlighted singularly or in groups and transferred into the second menu of selected template fields 564 using a set of movement controls 570. The fields in the selected template fields 564, further, may be rearranged by the user in a presentation order (e.g., using arrows 572). The fields 562 populating the selected template fields 564, for example, may be used to highlight features of a particular deal in a particular way.

In some implementations, a user has the option to create reusable templates, eliminating the need recreating field selections upon each quote. As illustrated, the present template has been named "Treaty Reinsurance/Excess Property & Casualty" in a name entry field 566. Further, the user may be provided the ability to edit a saved template. In this manner, for example, the user may adjust previously used templates to better fit a current scenario. The previously stored template may be selected, for example, through a template drop-down menu 568. Additionally or alternatively, as noted in a warning message 574 at the bottom of the quote customization user interface 560, the user may alter an existing template. The alteration, for example, may cause a change to the template in all sections using the template. Alternatively, the user may customize any section, or layer of coverage, within the template.

Returning to FIG. 2A, the platform 204, in some implementations, stores the quote request template parameter settings (212). For example, as illustrated in FIG. 1, the quote template engine 140 of the system 108 may store the quote request template parameter settings as quote template information 120 in the transaction data repository 110.

In some implementations, the platform 204 prepares and supplies, for presentation to the broker 202, a reinsurer selection user interface (214). The broker 202, through the reinsurer selection user interface, may select one or more reinsurers for sharing a quote request based upon the quote request template. The reinsurers, in some embodiments, may be filtered by the platform 204 and/or the broker 202 to aid in selection of one or more reinsurers. In some examples, the reinsurers may be filtered by the market(s) identified within the quote template, reinsurers having a past relationship with the broker 202, product types identified within the quote template, business segments identified within the quote template, reinsurers satisfaction ratings, and/or reinsurers providing services within a particular geographic region.

In some implementations, the broker 202 selects one or more reinsurers through the reinsurer selection user interface, and prepares a quote request, using the quote request template, specifically geared to negotiations with the selected reinsurer(s). For example, the broker 202 may supply one or more deadlines 216 associated with negotiations with the one or more reinsurers. Further, the broker 202, in some implementations, provides contract layer settings 218 specific to particular sections of the quote request being prepared for negotiation. The contract layer settings 218, in some examples, may include term values, term editing settings, and/or layer visibility settings. The contract layer settings 218, in some embodiments, may vary in part based upon different reinsurers selected through the reinsurer selection user interface. For example, a first contract layer may be made visible by the broker 202 to a first reinsurer but not a second reinsurer.

Turning to FIG. 6A, for example, a quote request 600, based upon the quote template 550 of FIG. 5A, includes two layers 604a, 604b in contract section 602. Each layer 604a, 604b includes values associated with at least a portion of the terms. Additionally, each layer includes a deadline 606a, 606b of Dec. 31, 2015.

Returning to FIG. 2A, in some implementations, the platform 204 stores the reinsurer selections, deadlines, and contract layer settings (220). For example, as illustrated in FIG. 1, the quote template engine 140 of the system 108 may store the deadline(s), reinsurer selection(s) and contract layer settings as active quote data 122 in the transaction data repository 110.

In some implementations, the platform 204 prepares a document upload user interface (222) for presentation to the broker 202. The document upload user interface, for example, may provide the broker 202 with the opportunity to upload one or more documents and associate the document(s) with the quote request. The documents, in some examples, may include contracts, contract addendums, electronic signatures, term agreements, client information (e.g., financial, structural, etc.), and/or broker information. In some embodiments, the document upload user interface allows the broker 202 to select a type of document. The type, for example, may be provided for audit trail purposes (e.g., contract proposal, contract addendum, executed contract, etc.). Additionally, the document upload user interface may allow the broker 202 to apply visibility settings associated with each document. For example, the broker 202 may elect to make the document visible to only one reinsurer associated with the quote request. In some embodiments, the broker 202 may later opt to "unshare" a particular document with one or more reinsurers. Further, in some embodiments, the broker 202 may apply read/write access controls to the document. Alternatively, documents may be read-only when supplied to the platform 204, for example to maintain content control for auditing purposes.

In some implementations, the broker 202 supplies, via the document upload user interface to the platform 204, one or more documents and document access control settings (224). For example, as illustrated in FIG. 1, the broker computing system 102 may supply the document(s) and access control setting(s) to the system 108 through the dashboard GUI engine 134.

In some implementations, the platform 204 stores the broker document(s) 226. For example, the document management engine 138 of the system 108 of FIG. 1 may store the broker documents and settings as document data 126 in the document repository 112.

In some implementations, the platform 204 provides a quote request available notification and/or quote entry user interface (228) for presentation to the vendor 206. The notification/user interface, for example, may be provided in response to the broker 202 releasing the quote request for sharing with the reinsurer(s). For example, the document upload user interface may include a quote release. Alternatively, the broker 202 may release the quote request for sharing with the vendor 206 via a separate user interface (e.g., via the reinsurer selection user interface or other quote preparation user interface).

Figure 4:
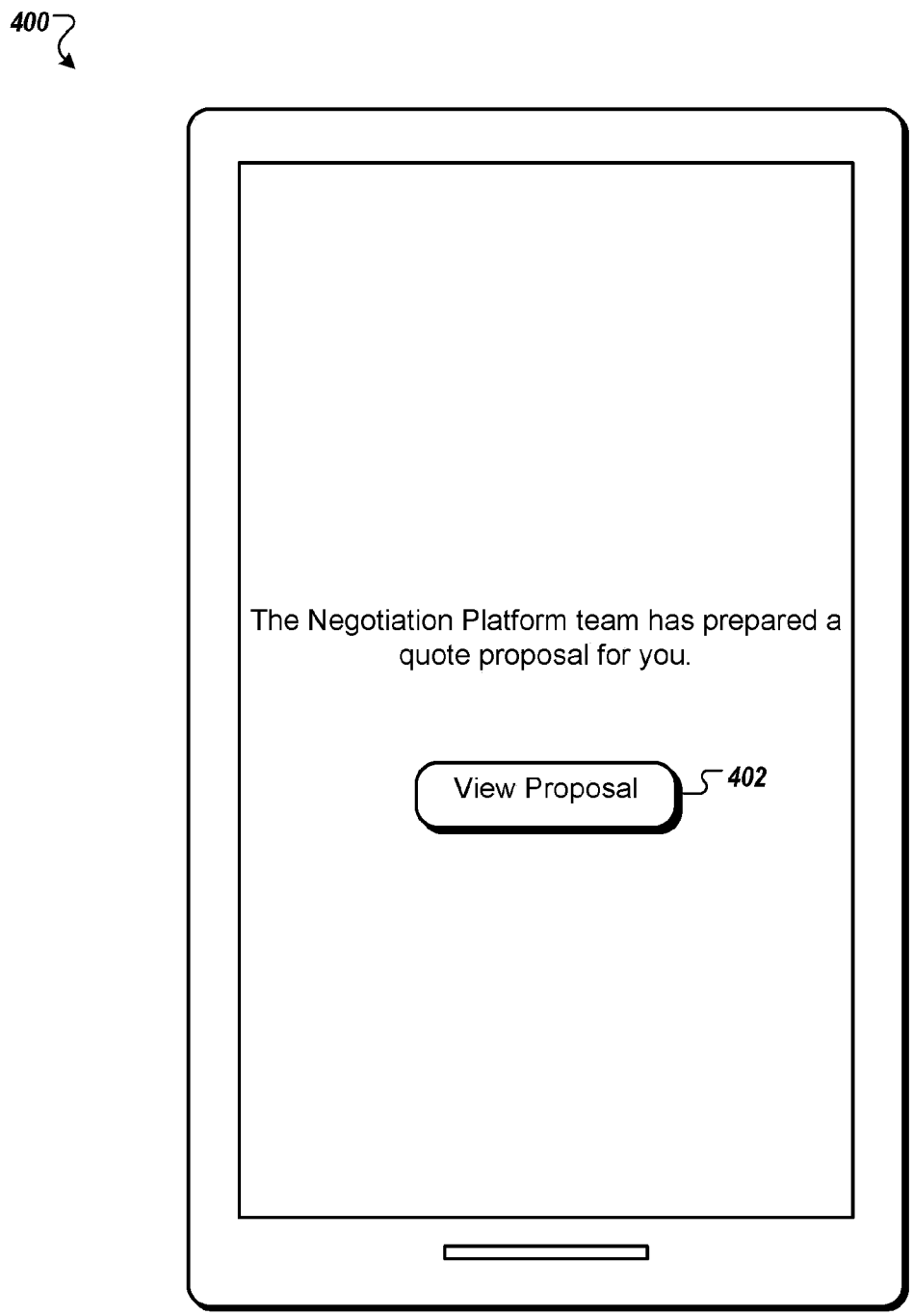
FIG. 4 is an example screen shot of an automated notification regarding a pending negotiation.

In the event of a quote request available notification, one or more users associated with the vendor 206, in some implementations, receive an automated notification via a personal computing device, such as a mobile device app notification. Turning to FIG. 4, a mobile app notification interface 400 alerts the user regarding a new quote proposal and invites the user to view the proposal through selection of a "view proposal" control 402. The quote request available notification, for example, may be prepared and issued by the real-time notification engine 148 of the system 108, as illustrated in FIG. 1. Other examples of real-time notifications include SMS message, a dashboard alert (e.g., supplied by the dashboard GUI engine 134 of the system 108), and an automated voicemail message.

Figure 3A:
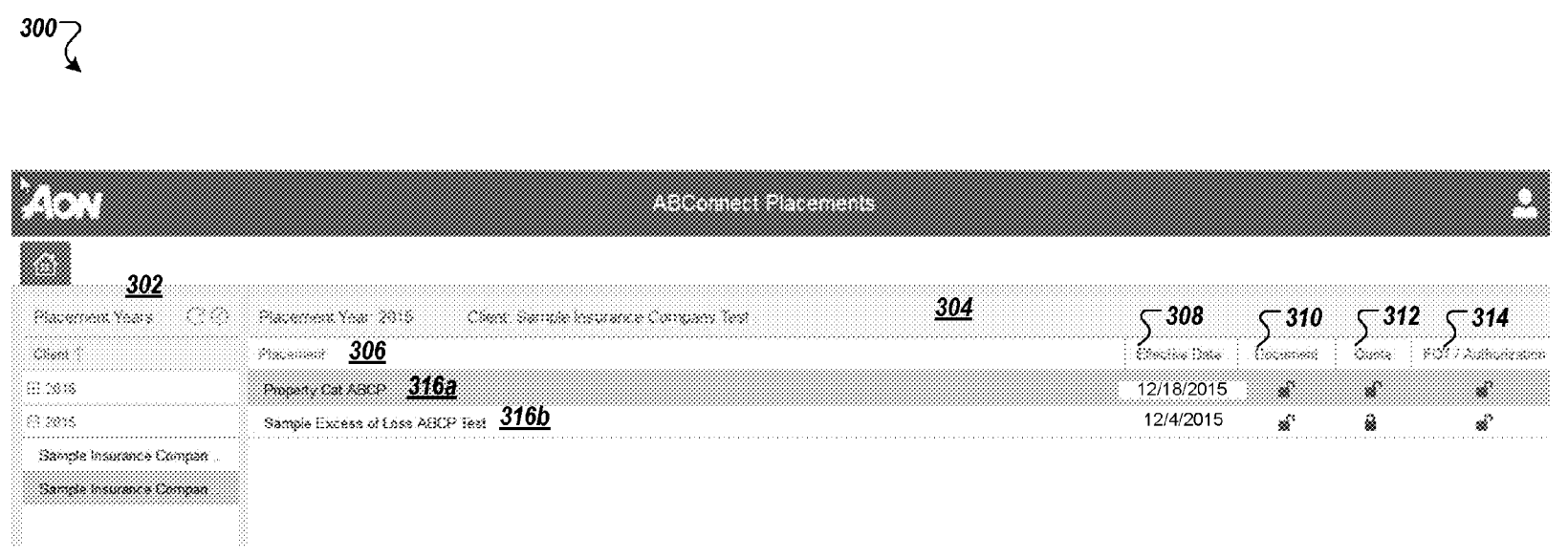

In the event of a quote entry user interface, in some implementations, the vendor 206 may be presented with a reinsurer dashboard interface 300, as illustrated in FIG. 3A. Turning to FIG. 3A, the dashboard interface 300 includes a listing of clients 302 by placement year. Year 2015 and client "Sample Insurance Company" are selected within the listing of clients 302, causing presentation of a listing of placements 304 related to client "Sample Insurance Company". Each placement 306 in the listing of placements 304 includes an effective date 308 (e.g., the date the broker released the quote request to the reinsurer), a document indicator 310 (e.g., indicating whether any documents are available), a quote indicator 312 (e.g., indicating whether the quote request is open for editing), and a firm order terms (FOT)/authorization indicator 314 (e.g., indicating whether the quote request is open for authorization). As illustrated, a new quote request 316a (dated Dec. 18, 2015 with a quote indicator 312 designated an unlocked state) is available for reinsurer selection.

Figure 3B:
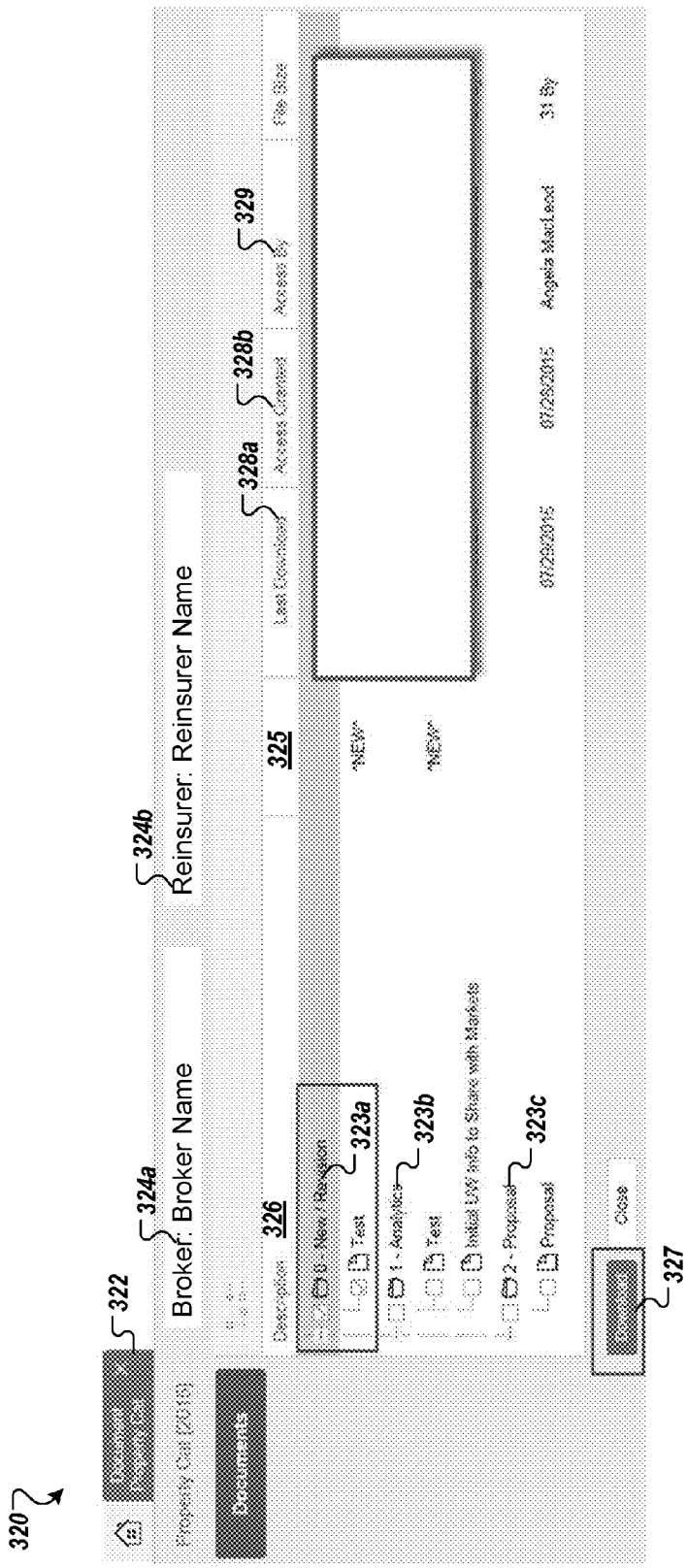
Figure 3C:
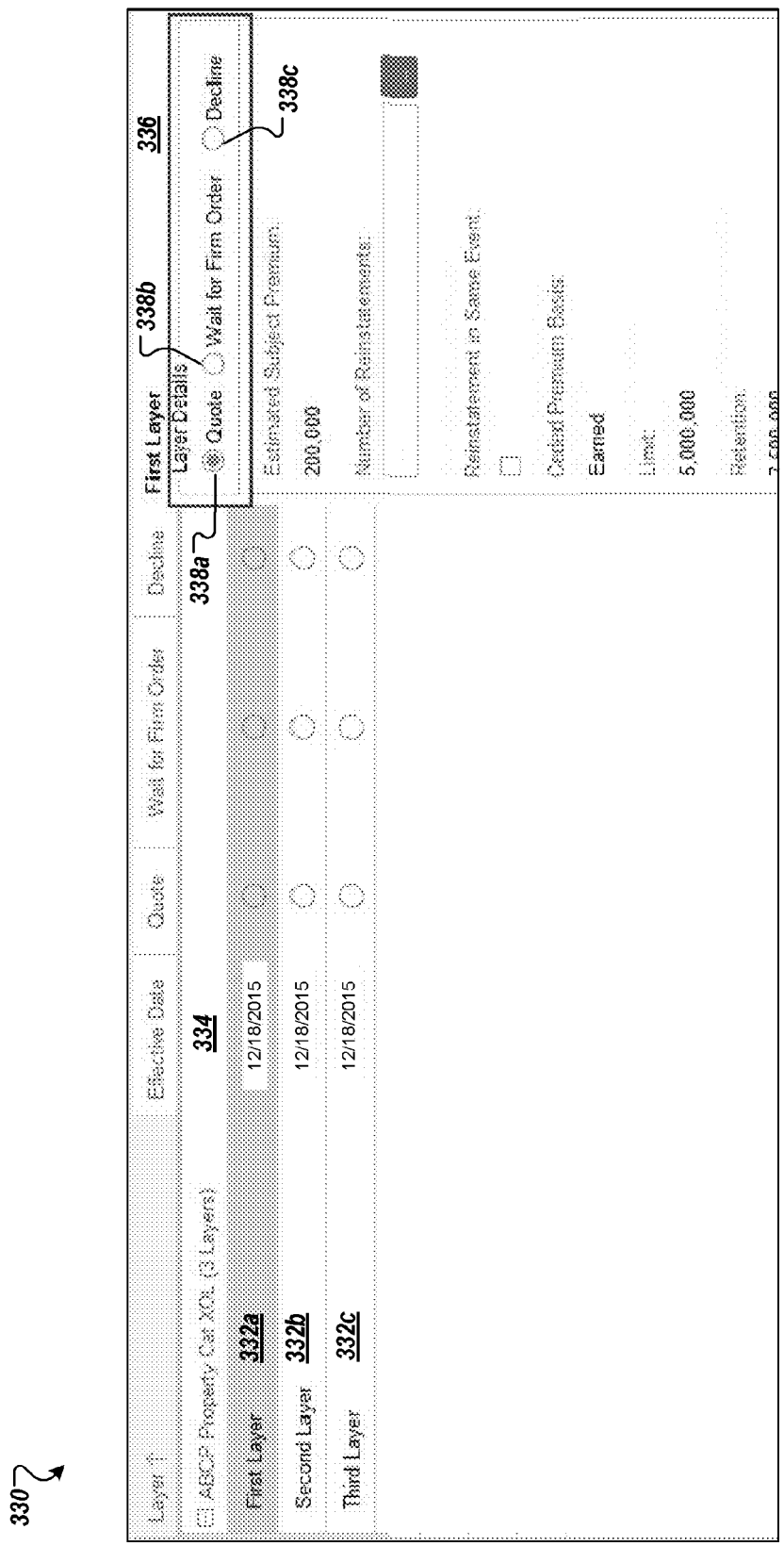

Upon selection of the new quote request 316a, in some implementations, the reinsurer is presented with a quote edit user interface 330, as illustrated in FIG. 3C. Turning to FIG. 3C, the quote edit user interface includes a listing of contract layers 332, each including a respective effective date 334. As illustrated, a first layer 332a is selected, and layer details 336 are presented to the reinsurer for review and editing via a quote interface 338a. The layer details 336, for example, correspond to the visible quote request terms as designated in the quote contract section 602 of the quote request 600 of FIG. 6A. Turning to FIG. 6A, as illustrated, a displayed section 608 corresponds generally to the terms illustrated in the layer details 336. At this point in the negotiation, the reinsurer has not submitted the quote. Turning to FIG. 6B, a quote process diagram 610 illustrates that the term values of Quote A are "Not Submitted", a set of editable terms 612 being available for reinsurer modification, including a layer 1 occurrence limit term 612a, a layer 1 per person limit term 612b, a layer 2 occurrence limit term 612c, and a layer 2 per person limit term 612d (presently blank). Turning to FIG. 6C, a quote process diagram 620 illustrates that the layer 2 per person limit term 612d has been modified by the reinsurer with the addition of the value 5000. Returning to the quote edit user interface of FIG. 3C, the reinsurer may optionally modify the editable quote terms of the pending quote. Alternatively, the reinsurer may opt to wait for a firm order from the broker 338b or decline quoting 338c.

As part of reviewing the quote request provided by the broker 202, the vendor 206 may review one or more documents uploaded by the broker 202. Turning to FIG. 3B, a document review user interface 320 presents a number of document listings 326 of documents made available by a first party 324a, 324b to the negotiation for review and download 327 by a user of a second party 324a, 324b to the negotiation. For example, a first party 324a may correspond to the broker 202 of FIG. 2A, while a second party 324b may correspond to the vendor 206 of FIG. 2A. The user interface 320, in some embodiments, is accessible to the second party 324b via the reinsurer dashboard interface 300 of FIG. 3A (e.g., as evidenced by document indicator 310).

The document listings 326 of the document review user interface 320, in some implementations, are arranged by category 323 (e.g., new/revised, analytics, proposal) so the user may quickly identify relevant documents. In a particular example, a new/revised category 323a may draw attention to any documents added and/or revised since the user's last access to the user interface 320. Alternatively or in addition to the new/revised category 323a, one or more document listings 326 may be associated with a status indicator 325 (e.g., *NEW* as illustrated), demonstrating a present status of the associated document listing 326.

In some implementations, the document review user interface 320 may include one or more dates 328 associated with the document listings 326, such as a last downloaded date 328a, indicating the date the document was most recently accessed by the user (or, alternatively, another user associated with the reinsurer 324b) and an access granted data 328b, indicating the date the user was granted access to the corresponding document. If the document has previously been accessed by the second party 324b, in the illustrated example, an access by indicator 329 may identify a particular user of the second party 324b who most recently accessed the corresponding document of the particular document listing 326.

Although not illustrated, in some embodiments, one or more documents may include access rights identifying whether the second party may edit or otherwise modify (e.g., rename, append comments to, etc.) a particular document identified within the document listing 326.

Turning to FIG. 2A, upon editing one or more quote terms, the vendor 206 provides customized quote details (230) to the platform 204. The customized quote details, for example, may be entered via the dashboard GUI engine 134 of the system 108 of FIG. 1 and provided to the negotiation automation engine 142.

In some implementations, the platform 204 stores the reinsurer quote details (232). For example, the quote details may be stored to the active quotes data 122 in the transaction data repository 110 by the system 108, as illustrated in FIG. 1. Further, the present state of the negotiation may be updated in the audit trail data 128 of the audit data repository 114 by the audit trail management engine 144.

Turning to FIG. 2B to continue the transaction process 200 of FIG. 2A, in some implementations, the platform 204 provides a quote available notification and/or quote review user interface (234) to the broker 202. The notification/user interface, for example, may be provided in response to the broker 202 releasing the quote request for sharing with the reinsurer(s). For example, the document upload user interface may include a quote release. Alternatively, the broker 202 may release the quote request for sharing with the vendor 206 via a separate user interface (e.g., via the reinsurer selection user interface or other quote preparation user interface).

In the event of a quote available notification, one or more users associated with the broker 202, in some implementations, receive an automated notification via a personal computing device, such as a mobile device app notification, as described in relation to the automated notification process described in step 228. The quote available notification, for example, may be prepared and issued by the real-time notification engine 148 of the system 108, as illustrated in FIG. 1. Other examples of real-time notifications include SMS message, a dashboard alert (e.g., supplied by the dashboard GUI engine 134 of the system 108), and an automated voicemail message.

In the event of a quote review user interface, in some implementations, the broker 202 may be presented with the present terms of the quote, including the modification made by the vendor 206. For example, as shown in FIG. 6D, a quote process diagram 630 illustrates the terms associated with the pending quote, including the terms 612 editable by the reinsurer. The broker 202 may review these terms and determine, with the client, whether to accept the reinsurer's quote.

If the client agrees to the quote supplied by the vendor 206, in some implementations, the broker 202 issues a client firm order (236) to the platform 204. The first order may either validate the terms of the quote as adjusted by the vendor 206 or reinstate the initial terms as supplied by the broker 202 in the quote request. The firm order, in some embodiments, may be placed via a firm order user interface 350 as illustrated in FIG. 3F.

Figure 3D:
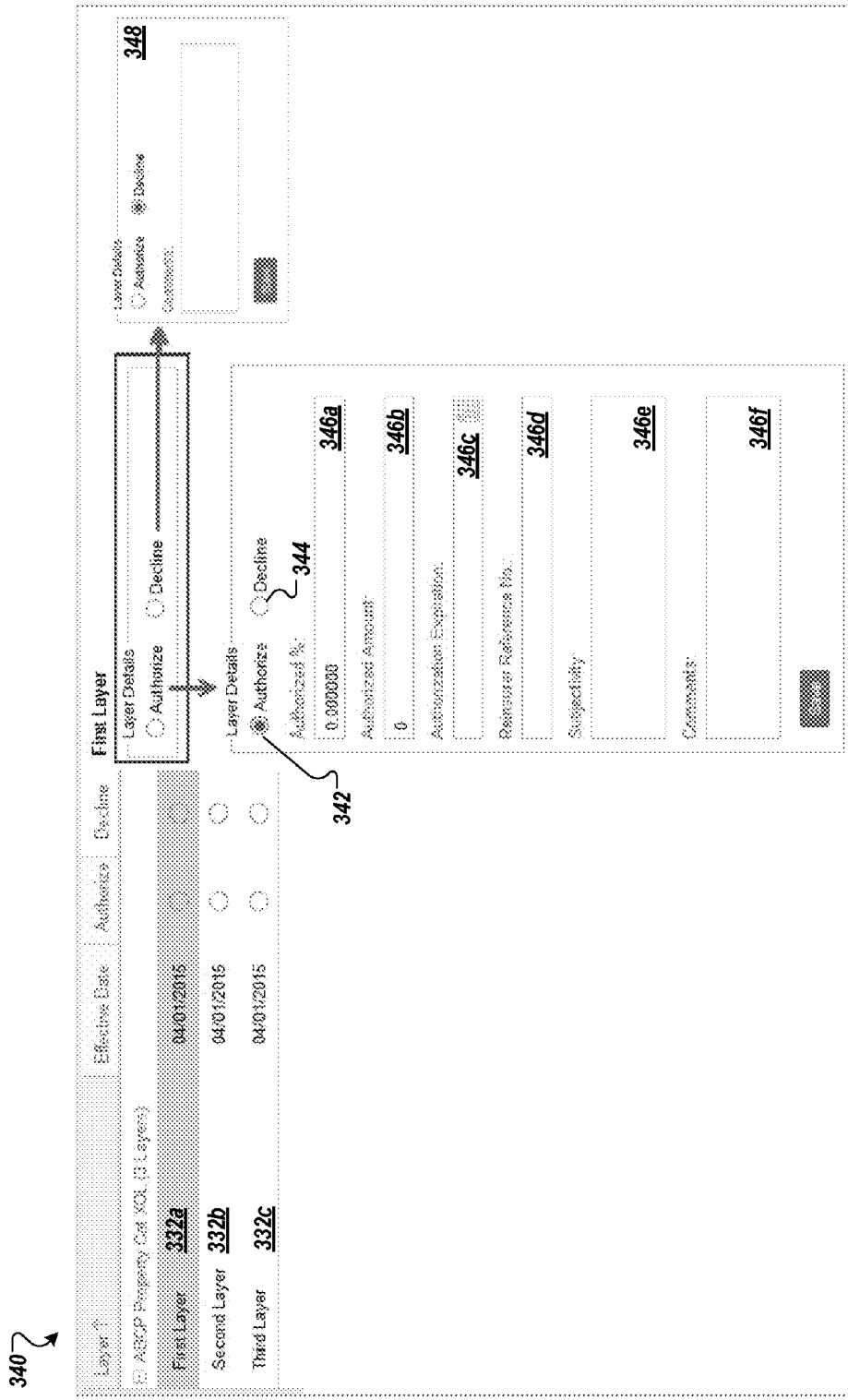
Figure 3E:
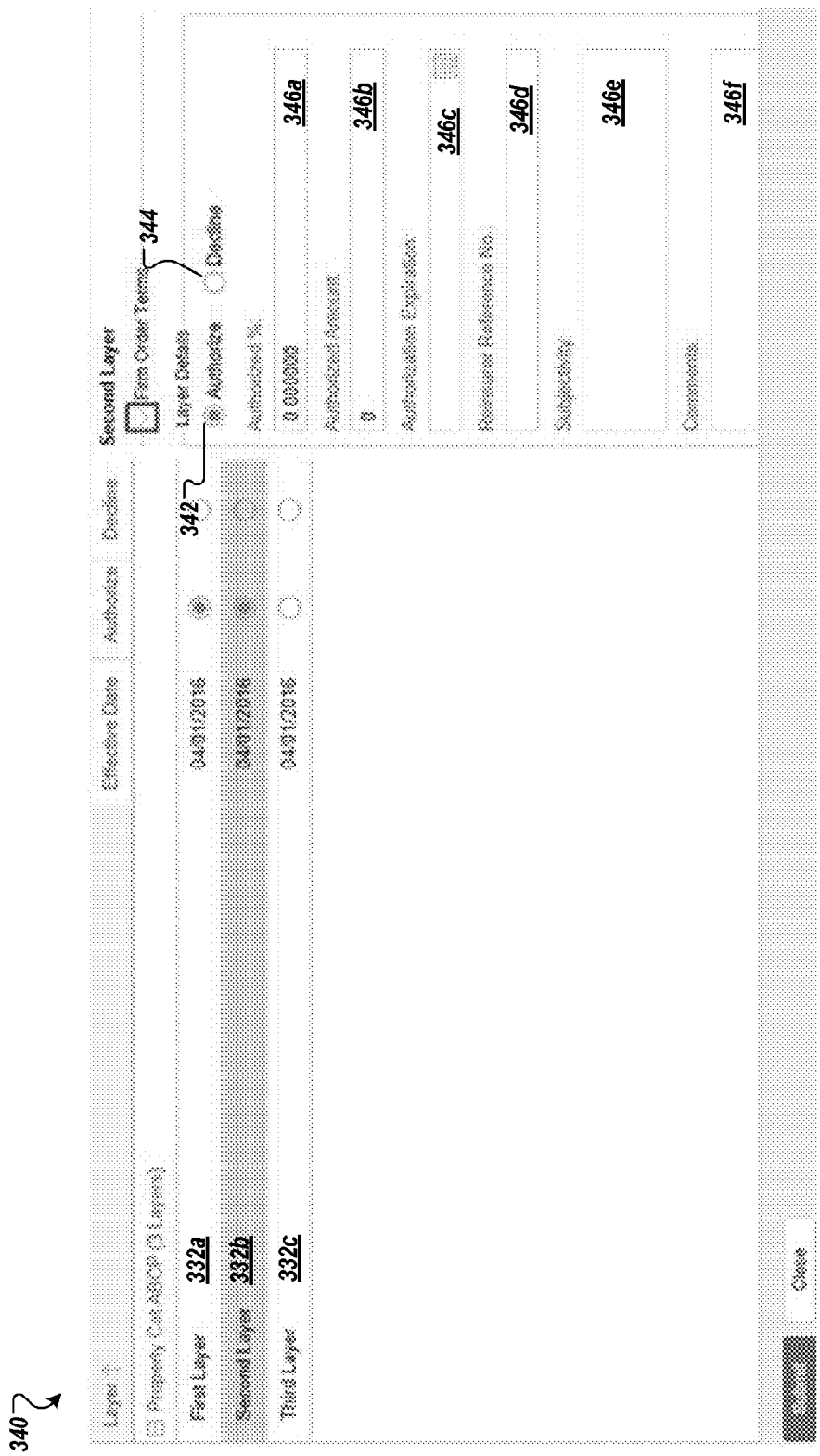
Figure 3F:
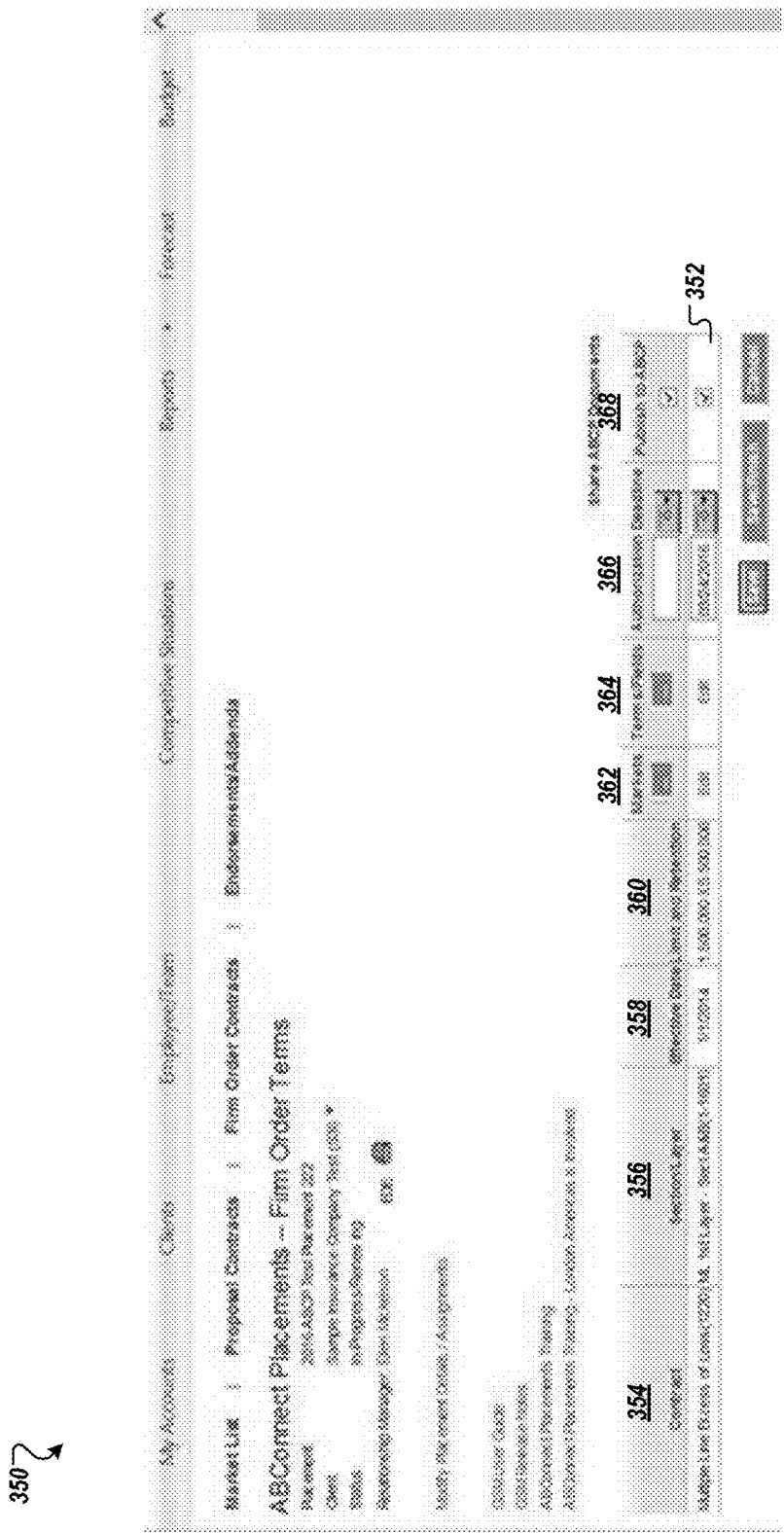

Turning to FIG. 3F, the firm order user interface 350 may include a listing of one or more pending transactions 352. Each pending transaction may be associated with an authorization deadline 366. Each pending transaction may include a transaction name or identifier 354, one or more layer identifiers 356, an effective date 358, and/or a limit and retention value 360. To modify the terms of the quote, a user may select a markets edit control 362 and/or a terms and fields edit control 364.

Upon selection of the markets edit control 362, in some implementations, the user may limit data access of particular markets. A selected market, for example, may be allowed to edit data, such as authorization percent, comments, and subjectivities. Additionally or alternatively, the user may grant read-only access to remaining markets using the markets edit control 362. While the quote enters a read-only state after submission, designated brokers within the selected market may utilize the control to unlock the read-only state and enter/edit data. The market edit control 362 may improve data quality and process management.

Upon selection of the terms and fields edit control 364, in some implementations, the user is presented with a graphical user interface for adding, removing, and/or exchanging present fields included in the pending quote as well as to adjust values associated with each of the terms represented by those fields. The user interface, for example, may be similar to the layer details illustrated in the graphical user interfaces of FIGS. 3D and 3E.

In some implementations, upon completion of validating, adjusting, or reinstating the terms of a particular transaction 354, the user may opt to publish the firm order (e.g., share with the associated reinsurer) via a publication control 368.

Once the firm order terms are established, these options are provided by the broker 202 to the platform 204, in some implementations, as client firm order terms (236).

In some implementations, the platform 204 stores the client firm order terms (238). For example, the firm order terms may be stored to the active quotes data 122 in the transaction data repository 110 by the system 108, as illustrated in FIG. 1. The firm order terms, for example, may be an adjustment validation or a term reinstatement. Further, the present state of the negotiation may be updated in the audit trail data 128 of the audit data repository 114 by the audit trail management engine 144.

In some implementations, the platform 204 provides, for presentation to the vendor 206, a firm order notification and/or firm order review user interface (240). The notification/user interface, for example, may be provided in real-time in response to the broker 202 providing the client firm order terms (236).

In the event of a firm order notification, one or more users associated with the vendor 206, in some implementations, receive an automated notification via a personal computing device, such as a mobile device app notification, as described in relation to the automated notification process described in step 228. The firm order notification, for example, may be prepared and issued by the real-time notification engine 148 of the system 108, as illustrate din FIG. 1. Other examples of real-time notifications include SMS message, a dashboard alert (e.g., supplied by the dashboard GUI engine 134 of the system 108), and an automated voicemail message.

In the event of a firm order review user interface, in some implementations, the vendor 206 is presented with the current terms of the quote, including any reinstatement made by the broker 202. For example, as shown in a layer authorization user interface 340 of FIG. 3D, the vendor 206 may elect to authorize 342 or decline 344 each individual layer 332 of the quote. In the event of authorization, the reinsurer is presented with a set of controls 346 for entering authorization details. In particular, the authorization controls 346, as illustrated, include an authorized percentage data entry field 346a for authorizing the quote up to a percentage difference from the present proposed values, an authorized amount data entry field 346b for authorizing the quote up to a monetary difference from the present proposed values, an authorization expiration data entry field 346c for entering a deadline for client acceptance of the authorization, and a reinsurer reference number data entry field 346d for entering a reinsurer-specific identifier related to the pending quote.

Further, the authorization controls 346, as illustrated include a subjectivity text entry region 346e providing a text field for clarification and/or expansion on the meaning and scope of various quote terms and a comments text entry region 346f for adding any quote-specific information not captured by the remaining data entry fields 346.

Alternatively, if the reinsurer declines authorization of one or more of the layers 332, the reinsurer may enter comments into a text entry region of a declination dialogue box 348. For example, the reinsurer may supply reasons for declining authorization to the pending quote.

In some implementations, if the reinsurer declines authorization of one or more of the layers 332, the data mining engine 136 may generate metrics 124 associated with the reinsurer's risk appetite by comparing the terms of the declined layers and the terms accepted by the existing market. The generated metrics 124 may be stored in the transaction data repository 110.

FIG. 3E shows another exemplary screen shot of the layer authorization user interface 340 when the reinsurer selects a second layer 332b. In some embodiments, the vendor 206 may elect to authorize 342 or decline 344 the second layer 332b. In the event of authorization, the reinsurer is presented with a set of controls 346 for entering authorization details. In particular, the authorization controls 346, as illustrated, include an authorized percentage data entry field 346a for authorizing the quote up to a percentage difference from the present proposed values, an authorized amount data entry field 346b for authorizing the quote up to a monetary difference from the present proposed values, an authorization expiration data entry field 346c for entering a deadline for client acceptance of the authorization, and a reinsurer reference number data entry field 346d for entering a reinsurer-specific identifier related to the pending quote. Further, the authorization controls 346, as illustrated include a subjectivity text entry region 346e providing a text field for clarification and/or expansion on the meaning and scope of various quote terms and a comments text entry region 346f for adding any quote-specific information not captured by the remaining data entry fields 346.

Alternatively, if the reinsurer declines authorization of the second layer 332b, the reinsurer may enter comments into a text entry region of a declination dialogue box, such as the text entry region of the declination dialogue box 348 shown in FIG. 3C. For example, the reinsurer may supply reasons for declining authorization to the pending quote.

Upon authorization and/or declination, in some implementations, the vendor 206 provides the authorization and/or declination information (242) to the platform 204. The information may additionally include one or more documents supplied by the vendor 206. For example, the reinsurer may include a contractual agreement, detailed proposal, or other information related to the transaction as a separate document.

In some implementations, the platform 204 stores the reinsurer authorization information (244). For example, the information entered into the data fields 346 or declination reasons entered via dialogue box 348 may be stored to the active quotes data 122 in the transaction data repository 110 by the system 108, as illustrated in FIG. 1. The authorization information, for example, may be a quote validation. Further, the present state of the negotiation may be updated in the audit trail data 128 of the audit data repository 114 by the audit trail management engine 144.

In some implementations, the platform 204 provides a marketing results notification and/or quote review user interface (246) to the broker 202. The notification/user interface, for example, may be provided in response to the vendor 206 submitting the authorization and/or declination information for sharing with the broker 202.

In the event of a marketing results notification, one or more users associated with the broker 202, in some implementations, receive an automated notification via a personal computing device, such as a mobile device app notification, as described in relation to the automated notification process described in step 228. The marketing results notification, for example, may be prepared and issued by the real-time notification engine 148 of the system 108, as illustrated in FIG. 1. Other examples of real-time notifications include SMS message, a dashboard alert (e.g., supplied by the dashboard GUI engine 134 of the system 108), and an automated voicemail message.

In the event of a marketing results user interface, in some implementations, the broker 202 may be presented with the present terms of the quote, including the authorization information and/or declination comments submitted by the vendor 206. For example, as shown in FIG. 6E, a quote process diagram 640 illustrates the terms associated with the pending quote, including the terms 612 authorized by the reinsurer. The broker 202 may review these terms and share with the client. In some implementations, the broker 202 provides client final lines (248) regarding the finalized transaction terms to the platform 204. In some embodiments, the final lines include terms/contracts/details contained in one or more documents for sharing with the vendor 206. This confirms the agreement reached. In some embodiments, rather than including simply an automated collection of the agreed upon terms, the broker representative submitting information through the broker 202 has the opportunity to enhance or customize the final lines information with additional information. In some examples, the broker representative may add a personalized note, such as a thank you or a request for feedback, or other brokerage-specific information, Further, in some embodiments, the broker 202 may be invited to acknowledge and confirm the content of the final lines. In response to receiving the client final lines, in some implementations, the platform 204 stores the client final lines (250). For example, the client final lines information may be stored to the active quotes data 122 in the transaction data repository 110 by the system 108, as illustrated in FIG. 1. Further, the present state of the negotiation may be updated in the audit trail data 128 of the audit data repository 114 by the audit trail management engine 144. The details, in some embodiments, may be released to the data mining engine 136 of FIG. 1 for developing metrics data. The data mining engine 136, for example, may combine the present transaction data with other historical transaction data in developing metrics data 124, stored in the transaction data repository 110.

In some implementations, the platform 204 provides a final lines review user interface (252) to the vendor 206 for review of the finalized information. For example, the reinsurer may access the completed transaction information via a dashboard interface.

In some implementations, the platform 204 prepares and stores the audit trail regarding the finalized transaction (254). Rather than updating the audit trail at each stage of the transaction, for example, audit trail information may be collected and stored after the transaction is finalized (or, alternatively, canceled at a prior step within the transaction process 200).

In some embodiments, with proper authorization, the auditor system 106, the vendor computing systems 104, or the brokers computing systems 102 may access the audit trail information 128 in the audit data repository 114 to search for misplaced information relating to current or past quotes. For example, in the event of a catastrophic system failure relating to a repository system relating to the vendor computing systems 104, the reinsurer may access the audit data repository 114 to retrieve documents relating to the state of negotiation.

In certain implementations, various departments within the organization managing the system 108 may access the audit data repository 114, the transaction data repository 110, and/or the document repository 112. For example, a legal department within the organization may access the audit trail information 128 for internal auditing in order to satisfy local and federal government compliance. A marketing department may utilize stored information to generate marketing data and develop marketing strategy.

Continuing the discussion relating to FIG. 1, in some exemplary embodiments, an information technology department within the organization may monitor the audit trail information 128 stored in the audit data repository 114 to assess the performance and functionality of the system 108, and the repositories 110, 112, 114. Alternatively, an information technology (IT) department may rely on data collected from the audit trail information 128 to assess the overall health of the environment 100.

In some embodiments, the accounting department within the organization may use the audit trail information 128 to generate reports detailing the financial state of the organization and sanity check transactions. The accounting department may compile statistical data relating to risk appetite, market trend, etc.

If, for example, disputes relating to the quotes arise during or after the completion of a transaction, internal and/or external audit teams may access the audit trail information 128 in the audit data repository 114 for proof of a binding contact including stated terms and conditions. External accounting agencies may similarly access the audit trail information 128 for independent auditing and/or settling possible dispute.

In certain embodiments, the audit trail information 128 may include both content data and metadata. The metadata may indicate a user identification number of a broker, a user identification number of a reinsurer and timestamp for a transaction. The metadata may be available to the internal/external auditors.

Although illustrated as a single entity "platform 204", the platform 204 may include a number of interoperating systems, such as a reinsurer-interfacing system, a broker-interfacing system, and an audit trail management system. Similarly, the broker 202 and/or vendor 206 may represent a number of computing devices and/or system. For example, a first broker user or computing device may supply the quote request template parameter settings (210), while a different broker user or computing device applies the contract layer settings (218).

Although illustrated in a particular series of events, in other implementations, the steps of the transaction process 200 may be performed in a different order. For example, the broker may iterate between setting template parameter settings (210), deadline(s) (216) and/or contract layer settings (218) while setting up a quote request for a reinsurer. Additionally, in other embodiments, the transaction process may include more or fewer steps while remaining within the scope and spirit of the transaction process 200.

FIG. 7 illustrates an example response received by a broker for a previously submitted quote. An authorization confirmation table 700 includes, for example, four contract layers 710 from up to four different reinsurers. Each layer may include an authorize response 720, an authorization expiration 730, a subjectivity 740, and comments 750. In some implementations, the broker may receive the authorization confirmation from four reinsurers, with each reinsurer responding to a different layer. Reinsurer 1 may respond to layer 1 710a with an authorize response 720a of 15.000000%, an authorization expiration date 730a of Mar. 10, 2016, and a subjectivity 1 740a. The authorize response 720a includes an authorized percentage difference from the present proposed values included in the quote. The authorization expiration 730a indicates the date of expiration for the authorization confirmation for layer 1 710a provided by Reinsurer 1. The subjectivity field 740a may include additional terms and conditions for the contract.

In certain embodiments, Reinsurer 2 may enter a comment 750a for layer 2 710b with response for adding any quote-specific information not captured by the remaining data entry fields. Reinsurer 4 for layer 4 710d may choose to decline the submitted quote in the authorize response 720b, and provide a reason for declination in a comment field 750b.

In some implementations, the authorization confirmation table 700 shown in FIG. 7 may be presented in a dashboard interface similar to those shown in FIGS. 3A-3E. The dashboard interface may be provided to the broker computing system 102 by the dashboard GUI engine 134. The dashboard GUI engine 134 may routinely update dashboard interface on the broker computing system 102 as reinsurers for different layers submit their responses separately. Alternatively, the dashboard GUI engine 134 may wait for responses from all reinsurers before sending the authorization confirmation table 700 to the broker computing system 102.

Figure 5C:
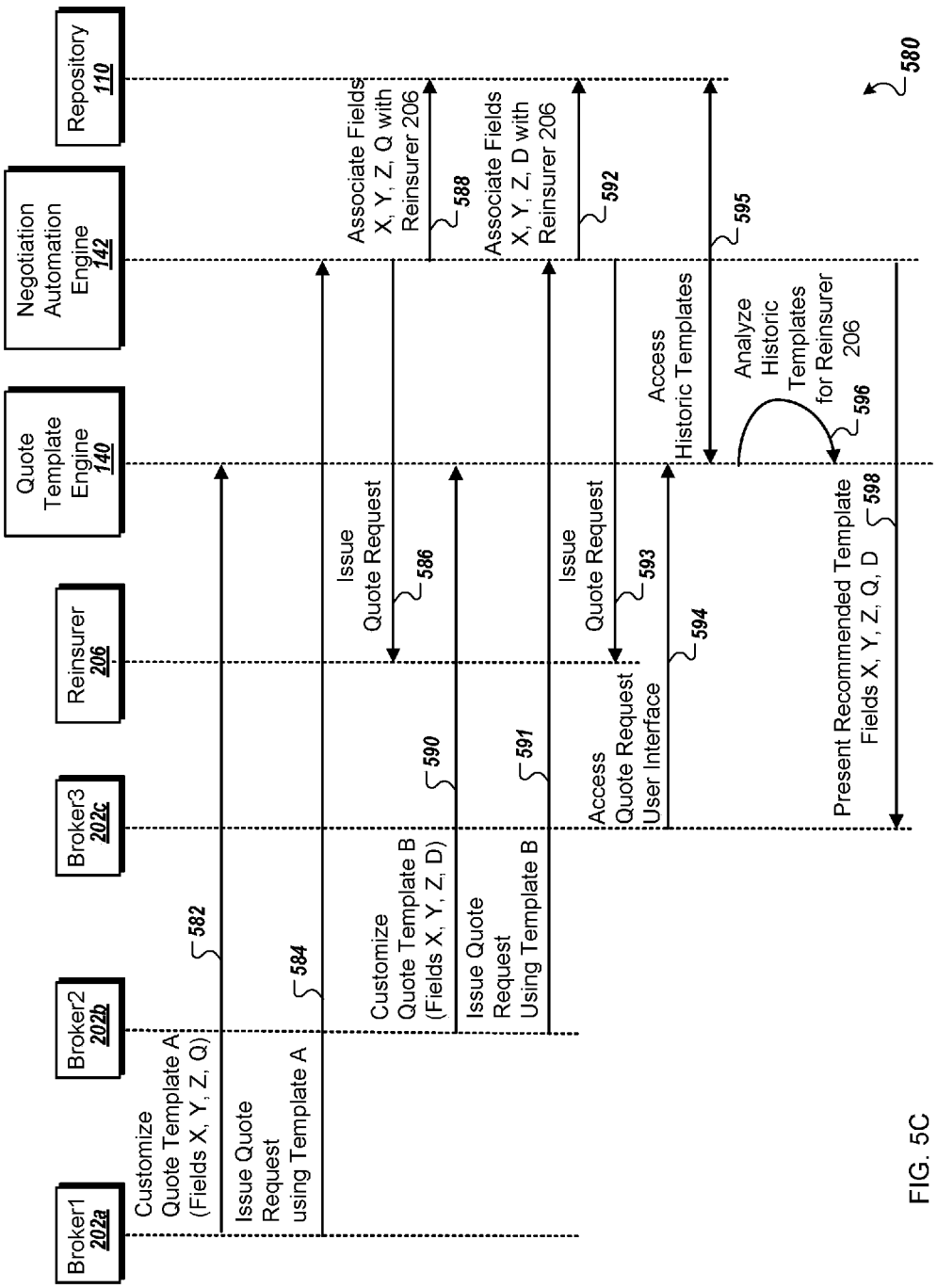
FIG. 5C is a swim lane diagram illustrating example communication flows.

FIG. 5C is a flow diagram illustrating communication flows between a first, second, and third brokers 202, vendor 206, negotiation automation engine 142, transaction data repository 110, and quote template engine 140 during example transaction processes 580. The transaction processes 580, for example, may be supported by the environment 100 of FIG. 1, where the brokers 202 represent the broker computing systems 102 and the vendor 206 represents the vendor computing systems 104.

In some implementations, a first broker 202a customizes (582) a quote template "Quote Template A" using fields X, Y, Z, and Q via the quote template engine 140. The quote template, for example, may be built using the user interface 580 described in relation to FIG. 5B. The first broker 202a may reside or do business in a first geographic region (e.g., country, province, continent, etc.). The first broker 202a may or may not have a preexisting business relationship with vendor 206.

In some implementations, the first broker 202a issues (584) a request for a quote via the negotiation automation engine 142. The request, for example, may be submitted by the first broker 202a via the quote request interface itself or via an additional user interface including selection of the preexisting quote template. The request, for example, may identify vendor 206 as a particular (targeted) reinsurer or as one of a list of reinsurers identified by the user. The reinsurer, in a particular example, may be selected by the first broker 202a via a reinsurer selection interface. The quote request, in another example, may be entered via a quote request interface such as the quote request 600 illustrated in FIG. 6A.

In some implementations, the negotiation automation engine 142 issues (586) the quote request to vendor 206.

Issuance may be based upon selection of vendor 206 by the first broker 202a. Alternatively, the negotiation automation engine 142 may identify vendor 206 as an appropriate candidate for the quote request based upon the information provided by the first broker 202a. In transmitting the quote request, in some examples, the negotiation automation engine 142 may provide the vendor 206 with access to review quote information via a dashboard interface, or the negotiation automation engine 142 may issue a real-time notification regarding submission of the quote request by the first broker 202a.

In some implementations, the negotiation automation engine 142 associates (588) the fields selected in Quote Template A (X, Y, Z, Q) with the vendor 206 in the repository 110. The repository 110, for example, may include a collection of quote templates prepared via the quote template engine arranged in a database associating each quote template with contextual parameters such as, in some examples, creator of the quote request (e.g., broker), receiver(s) of the quote request (e.g., reinsurers), business segment, geography, deal size, date, product, client, etc.

Although illustrated as occurring after step 586 of issuing the quote request, in other embodiments, step 688 of associating the fields of Quote Template A may occur prior to or simultaneous with step 586. Additionally, although customizing the quote template is illustrated as being handled by the quote template engine 140, while issuance of the quote request is illustrated as being handled by the negotiation automation engine 142, each of these steps may be part of what the first broker 202a perceives as a single graphical user interface-guided process, for example managed by the dashboard GUI engine 134 of FIG. 1. Other modifications are possible while remaining within the scope and intent of the example transaction processes 580.

At a later time, a second broker 202b initiates a similar transaction process. In some implementations, the second broker 202b customizes (590) a quote template using fields X, Y, Z, and D via the quote template engine 140. The quote template, for example, may be built in a similar manner as described above in relation to step 582. The second broker 202b may reside or do business in a second geographic region different than the first geographic region. The second broker 202b, similar to the first broker 202a, may or may not have a preexisting business relationship with vendor 206.

In some implementations, the second broker 202b issues (591) a request for a quote via the negotiation automation engine 142. The request, for example, may be submitted by the second broker 202b in a similar manner as described above in relation to step 584.

In some implementations, the negotiation automation engine 142 associates (592) the fields selected in Quote Template B (X, Y, Z, D) with the vendor 206 in the repository 110. Association may be conducted in a manner similar as described above in relation to step 588.

In some implementations, the negotiation automation engine 142 issues (593) the quote request to vendor 206. Issuance may be implemented in a manner similar as described above in relation to step 586.

At a later time, a third broker 202c accesses (594) the quote request user interface via the quote template engine 140 to request a quote from at least vendor 206 (and, optionally, one or more additional reinsurers). The third broker 202c may reside or do business in a third geographic region (e.g., country, province, continent, etc.). The third broker 202c may or may not have a preexisting business relationship with vendor 206.

To aid in template development, in some implementations, the quote template engine 140 accesses (595) previously stored templates associated with vendor 206 from the repository 110 and analyzes (596) the previously stored templates to determine a recommended template. The previously stored templates, in some embodiments, may all be associated with vendor 206. The quote template engine 140, in some examples, may identify Template A and Template B as sharing certain contextual parameters with the quote request being developed by the third broker 202c such as, in some examples, creator of the quote request (e.g., broker), receiver(s) of the quote request (e.g., reinsurers), business segment, geography, deal size, date, etc. Further, the quote template engine 140 may consider the recency and frequency of use of each of the previously stored templates.

In some implementations, the quote template engine 140 presents (598) the recommended template fields X, Y, Z, Q, and D to the third broker 202c via the quote request user interface. For example, the recommended template fields X, Y, Z, Q, and D may be automatically populated in the menu 564 of the quote customization user interface 560 of FIG. 5B. In another example, the available fields in the menu 562 of the quote customization user interface 560 may be rearranged such that the recommended template fields X, Y, Z, Q, and D are presented at the top of the list.

These types of processes may continue, with the repository 110 building information regarding templates frequently used and fields most frequently desired by a number of brokers, and the quote template engine 140 may continue, based upon the increasing information, to refine recommendations based upon quote templates used in similar circumstances to those presented by a current requestor. In some implementations, the quote template engine 140 may track a usage history of each template for a requestor. The quote template engine 140 may also record a number of times a requestor uses a suggested template.

Figure 8A:
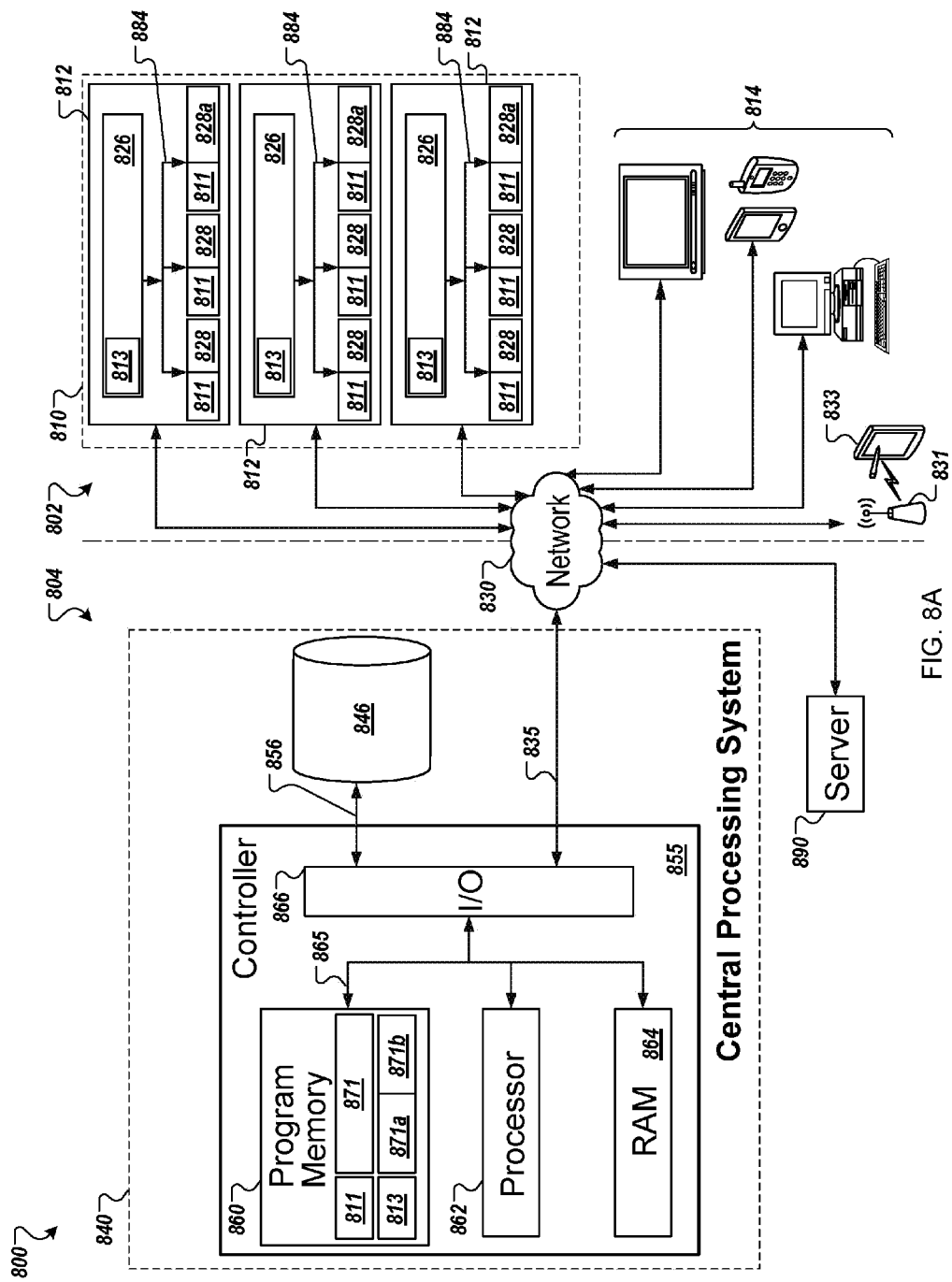
FIGS. 8A and 8B illustrate various aspects of an exemplary architecture implementing a platform for automated transaction negotiation, benchmarking, compliance, and auditing.
Figure 8B:
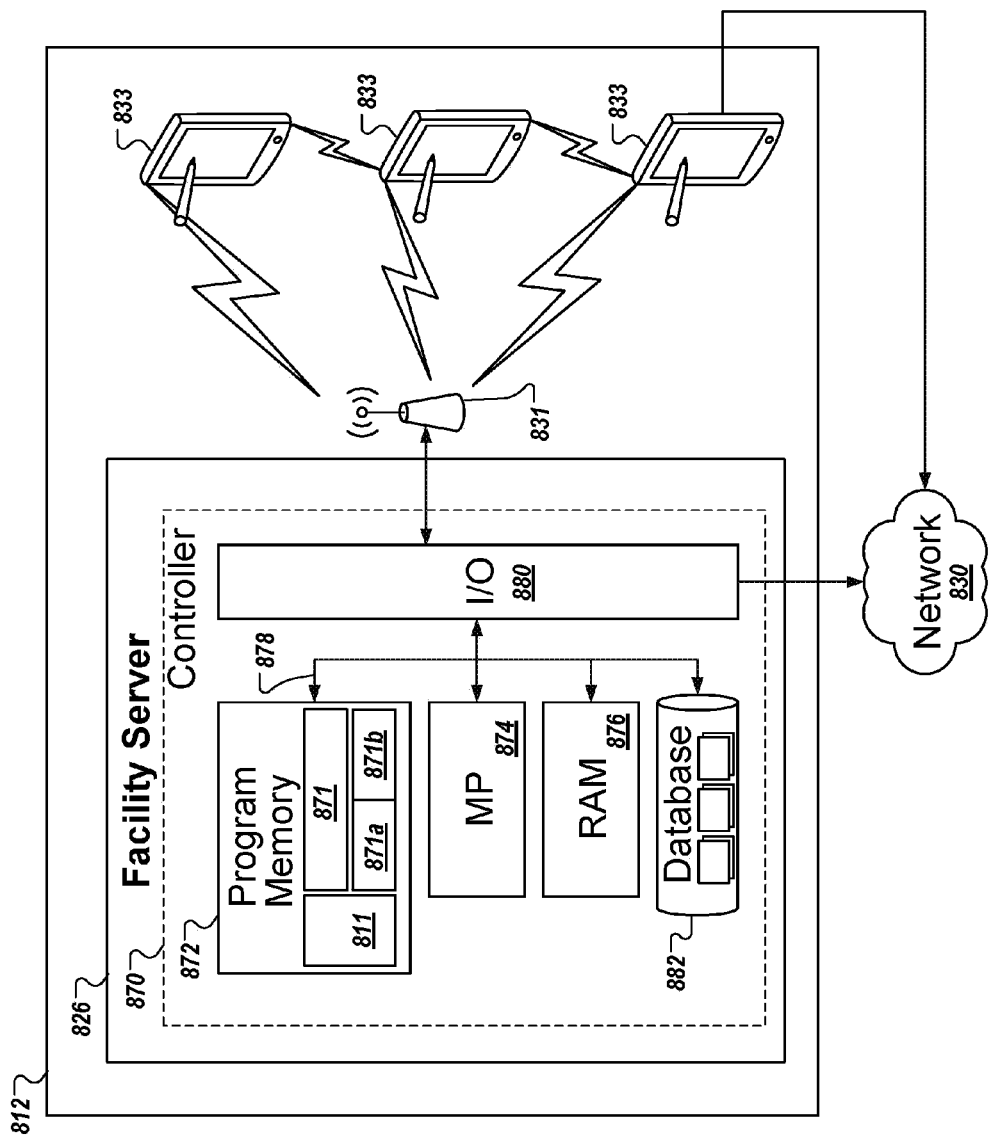

FIGS. 8A and 8B illustrate various aspects of an exemplary architecture implementing a platform 800 for automated transaction negotiation, benchmarking, compliance, and auditing. The high-level architecture includes both hardware and software applications, as well as various data communications channels for communicating data between the various hardware and software components. The platform 800 may be roughly divided into front-end components 802 and back-end components 804. The front-end components 802 are primarily disposed within a client network 810 including one or more clients 812. The clients 812 may be located, by way of example rather than limitation, in separate geographic locations from each other, including different areas of the same city, different cities, different states, or even different countries. The front-end components 802 may include a number of workstations 828. The workstations 828, for example, can be local computers located in the various locations 812 throughout the network 810 and executing various applications for automated transaction negotiation, benchmarking, compliance, and auditing.

Web-enabled devices 814 (e.g., personal computers, tablets, cellular phones, smart phones, web-enabled televisions, etc.) may be communicatively connected to locations 812 and the system 840 through a digital network 830 or a wireless router 2831, as described below.

Referring now to FIG. 8A, the front-end components 802, in some embodiments, include a number of facility servers 826 disposed at the number of locations 812 instead of, or in addition to, a number of workstations 828. Each of the locations 812 may include one or more facility servers 826 that may facilitate communications between the web-enabled devices 814 and the back-end components 804 via a digital network 830, described below, and between the terminals 828, 828A of the locations 812 via the digital network 830, and may store information for a number of customers/employees/accounts/etc. associated with each facility. Of course, a local digital network 884 may also operatively connect each of the workstations 828 to the facility server 826. Unless otherwise indicated, any discussion of the workstations 828 also refers to the facility servers 826, and vice versa. Moreover, environments other than the locations 812, such as the kiosks, call centers, and Internet interface terminals may employ the workstations 828, the web-enabled devices 814, and the servers 826. As used herein, the term "location" refers to any of these points of contact (e.g., call centers, kiosks, Internet interface terminals, etc.) in addition to the locations 812, etc. described above.

The front-end components 802 communicate with the back-end components 804 via the digital network 830. One or more of the front-end components 802 may be excluded from communication with the back-end components 804 by configuration or by limiting access due to security concerns. For example, the web enabled devices 814 may be excluded from direct access to the back-end components 804. In some embodiments, the locations 812 may communicate with the back-end components via the digital network 830. In other embodiments, the locations 812 and web-enabled devices 814 may communicate with the back-end components 804 via the same digital network 830, but digital access rights, IP masking, and other network configurations may deny access of the web-enabled devices 814. The web-enabled devices may also connect to the network 830 via the encrypted, wireless router 831.

The digital network 830 may be a proprietary network, a secure public Internet, a virtual private network or some other type of network, such as dedicated access lines, plain ordinary telephone lines, satellite links, combinations of these, etc. Where the digital network 830 includes the Internet, data communication may take place over the digital network 830 via an Internet communication protocol. In addition to one or more web servers 890 (described below), the back-end components 804 may include a central processing system 840 within a central processing facility. Of course, the locations 812 may be communicatively connected to different back-end components 804 having one or more functions or capabilities that are similar to the central processing system 840. The central processing system 840 may include processing circuitry (e.g., one or more computer processors) 862 adapted and configured to execute various software applications and components of the platform 800, in addition to other software applications, such as a medication management system.

The central processing system 840, in some embodiments, further includes a database 846 (which may include one or more databases). The database 846 can be adapted to store data related to the operation of the platform 800. The central processing system 840 may access data stored in the database 846 when executing various functions and tasks associated with the operation of the platform 800.

Although the platform 800 is shown to include a central processing system 840 in communication with three locations 812, and various web-enabled devices 814 it should be understood that different numbers of processing systems, locations, and devices may be utilized. For example, the digital network 830 (or other digital networks, not shown) may interconnect the platform 800 to a number of included central processing systems 840, hundreds of locations 812, and thousands of web-enabled devices 814. According to the disclosed example, this configuration may provide several advantages, such as, for example, enabling near real-time uploads and downloads of information as well as periodic uploads and downloads of information. This provides for a primary backup of all the information generated in the wireless data transfer process. Alternatively, some of the locations 812 may store data locally on the facility server 826 and/or the workstations 828.

FIG. 8A also depicts one possible embodiment of the central processing system 840. The central processing system 840 may have a controller 855 operatively connected to the database 846 via a link 856 connected to an input/output (I/O) circuit 866. It should be noted that, while not shown, additional databases may be linked to the controller 855 in a known manner.

The controller 855 includes a program memory 860, the processing circuitry 862 (may be called a microcontroller or a microprocessor), a random-access memory (RAM) 864, and the input/output (I/O) circuit 866, all of which are interconnected via an address/data bus 865. It should be appreciated that although only one microprocessor 862 is shown, the controller 855 may include multiple microprocessors 862. Similarly, the memory of the controller 855 may include multiple RAMS 864 and multiple program memories 860. Although the I/O circuit 866 is shown as a single block, it should be appreciated that the I/O circuit 866 may include a number of different types of I/O circuits. The RAM(s) 864 and the program memories 860 may be implemented as semiconductor memories, magnetically readable memories, and/or optically readable memories, for example. A link 835 may operatively connect the controller 855 to the digital network 830 through the I/O circuit 866.

FIG. 8B depicts one possible embodiment of the front-end components 102 [check number] located in one or more of the locations 812 from FIG. 8A. Although the following description addresses the design of the locations 812, it should be understood that the design of one or more of the locations 812 may be different from the design of others of the locations 812. Also, each of the locations 812 may have various different structures and methods of operation. It should also be understood that while the embodiment shown in FIG. 8B illustrates some of the components and data connections that may be present in a location 812, it does not illustrate all of the data connections that may be present in a location 812. For exemplary purposes, one design of a location is described below, but it should be understood that numerous other designs may be utilized.

Each of the locations 812, as illustrated, has one or more portable computing devices 833 (e.g., notebook computers, tablet computers, smart phones, personal data assistants, etc.) and/or a facility server 826. The digital network 884 and wireless router 831 operatively connect the facility server 826 to the number of portable computing devices 833 and/or to other web-enabled devices 814 and workstations 828. The digital network 830 may be a wide area network (WAN), a local area network (LAN), or any other type of digital network readily known to those persons skilled in the art. The digital network 830 may operatively connect the facility server 826, the portable computing devices 833, the workstations 828, and/or the other web-enabled devices 814 to the central processing system 840.

Each portable computing device 833, workstation 828, client device terminal 2828a, or facility server 826 includes a controller 870, as depicted in FIG. 8B in relation to the server 826. Similar to the controller 855 from FIG. 8A, the controller 870 includes a program memory 872, processing circuitry (e.g., one or more microcontrollers or microprocessors) 874, a random-access memory (RAM) 876, and an input/output (I/O) circuit 880, all of which are interconnected via an address/data bus 878. In some embodiments, the controller 870 may also include, or otherwise be communicatively connected to, a database 882. The database 882 (and/or the database 846 of FIG. 8A) includes data such as client records, broker, records, reinsurer information records, quote template data, and other rules and miscellaneous information. As discussed with reference to the controller 855, it should be appreciated that although FIG. 8B depicts only one microprocessor 874, the controller 870 may include multiple microprocessors 874. Similarly, the memory of the controller 870 may include multiple RAMs 876 and multiple program memories 872. Although the FIG. 8B depicts the I/O circuit 880 as a single block, the I/O circuit 880 may include a number of different types of I/O circuits. The controller 870 may implement the RAM(s) 876 and the program memories 872 as semiconductor memories, magnetically readable memories, and/or optically readable memories, for example.

Either or both of the program memories 860 (FIG. 8A) and 872 may also contain machine-readable instructions (i.e., software) 871, for execution within the processing circuitry 862 (FIG. 8A) and 874, respectively. The software 871 may perform the various tasks associated with operation of the location or locations, and may be a single module 871 or a number of modules 871a, 871b. While the software 871 is depicted in FIGS. 8A and 8B as including two modules, 871a and 871b, the software 871 may include any number of modules accomplishing tasks related to location operation.

In addition to the controller 870, the portable computing devices 833, the workstations 828 and the other web-enabled devices 814 may further include a display and a keyboard as well as a variety of other input/output devices (not shown) such as a scanner, printer, mouse, touch screen, track pad, track ball, isopoint, voice recognition system, digital camera, bar code scanner, RFID reader, etc. A location employee may sign on and occupy each portable computing device 833, workstation 828 or client device terminal 828a to assist the employee in performing his or her duties. Employees may sign onto the portable computing device 833, workstation 828 or the client device terminal 828a using any available technique, such as entering a user name and password. If an employee signs on to the system using a portable computing device 833, the network 884 communicates this information to the facility server 826, so that the controller 870 may identify which employees are signed onto the platform 800 and which portable computing device 833, workstation 828 or client device terminal 828a the employee is signed onto.

Various software applications resident in the front-end components 802 and the back-end components 804 implement functions related to location operation, and provide various user interface means to allow users (e.g., brokers) to access the platform 800. One or more of the front-end components 802 and/or the back-end components 804 may include a user-interface application 811 for allowing a user to input and view data associated with the platform 800, and to interact with the platform described herein. In one embodiment, the user interface application 811 is a web browser client, and the facility server 826 or the central processing system 840 implements a server application 813 for providing data to the user interface application 811. However, the user interface application 811 may be any type of interface, including a proprietary interface, and may communicate with the facility server 826 or the central processing system 840 using any type of protocol including, but not limited to, file transfer protocol (FTP), telnet, hypertext-transfer protocol (HTTP), etc. Moreover, some embodiments may include the user interface application 811 running on one of the web-enabled devices 814, while other embodiments may include the application 811 running on the portable computing device 833 in a location 812. The central processing system 840 and/or the facility server 826 may implement any known protocol compatible with the user-interface application 811 running on the portable computing devices 833, the workstations 828 and the web-enabled devices 814 and adapted to the purpose of receiving and providing the necessary information during the data transfer process.

Figure 8C:
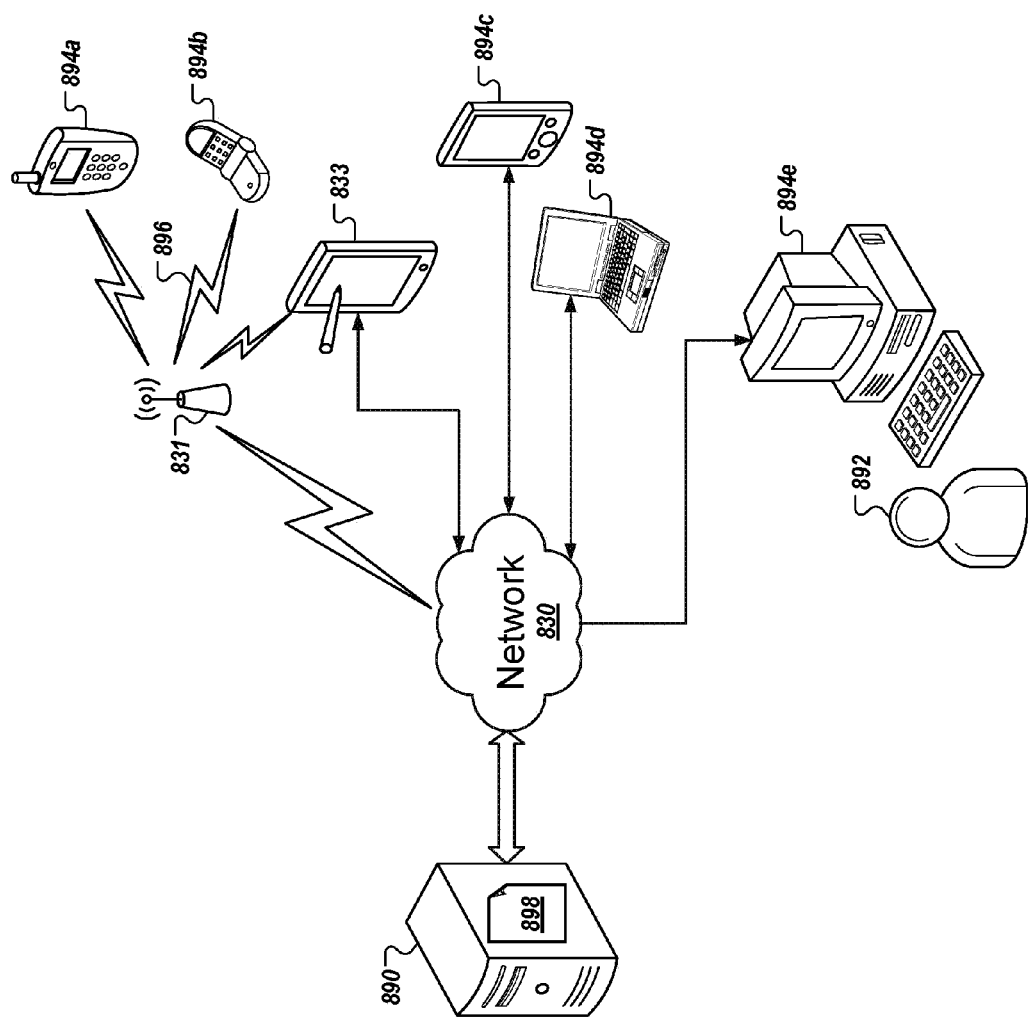
FIGS. 8C and 8D illustrate an example server interface for connecting user computing devices within a platform for automated transaction negotiation, benchmarking, compliance, and auditing.

For purposes of implementing the platform 800, the user interacts with location systems (e.g., the central processing system 840) via a number of web pages. FIG. 8C depicts a web server 890 connected via the network 830 to a number of portable computing devices 833 and other web-enabled devices through which a user 892 may initiate and interact with the platform 800. The web enabled devices may include, by way of example, a smart-phone 894a, a web-enabled cell phone 894b, a tablet computer 833, a personal digital assistant (PDA) 894c, a laptop computer 894d, a desktop computer 894e, a portable media player (not shown), etc. Of course, any web-enabled device appropriately configured may interact with the platform 800. The web-enabled devices 833 and 894 need not necessarily communicate with the network 830 via a wired connection. In some instances, the web enabled devices 833 and 894 may communicate with the network 830 via wireless signals 896 and, in some instances, may communicate with the network 830 via an intervening wireless or wired device 831, which may be a wireless router, a wireless repeater, a base transceiver station of a mobile telephony provider, etc. Each of the web-enabled devices 833 and 894 may interact with the web server 890 to receive web pages, such as the web page 898 depicted in FIG. 8C, for display on a display associated with the web-enabled device 833 and 894. It will be appreciated that although only one web server 890 is depicted in FIG. 8C, multiple web servers 890 may be provided for the purpose of distributing server load, serving different web pages, implementing different portions of the location web interface, etc.

Figure 8D:
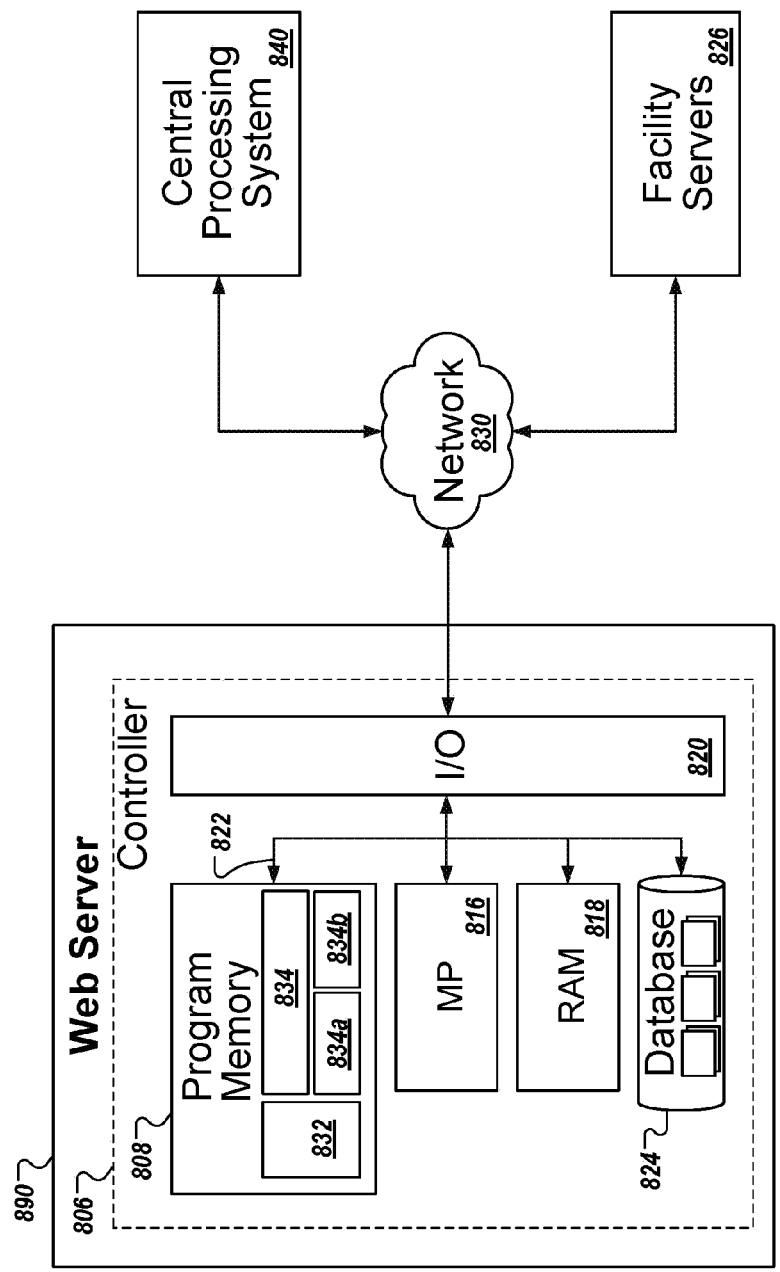

Turning now to FIG. 8D, the web server 890, like the facility server 826, includes a controller 806. Similar to the controllers 855 and 870, the controller 806 includes a program memory 808, processing circuitry (e.g., one or more microcontrollers or microprocessors) 816, a random-access memory (RAM) 818, and an input/output (I/O) circuit 820, all of which are interconnected via an address/data bus 822. In some embodiments, the controller 806 may also include, or otherwise be communicatively connected to, a database 824 or other data storage mechanism (e.g., one or more hard disk drives, optical storage drives, solid state storage devices, etc.). The database 824 may include data such as customer web profiles, product data, web page templates and/or web pages, and other data necessary to interact with the user 892 through the network 830. As discussed with reference to the controllers 855 and 870, it should be appreciated that although FIG. 8D depicts only one microprocessor 816, the controller 224 may include multiple microprocessors 816. Similarly, the memory of the controller 806 may include multiple RAMs 818 and multiple program memories 808. Although the FIG. 8D depicts the I/O circuit 820 as a single block, the I/O circuit 820 may include a number of different types of I/O circuits. The controller 806 may implement the RAM(s) 818 and the program memories 808 as semiconductor memories, magnetically readable memories, and/or optically readable memories, for example.

In addition to being connected through the network 830 to the user devices 833 and 1694, as depicted in FIG. 8C, FIG. 8D illustrates that the web server 890 may also be connected through the network 830 to the central processing system 840 and/or one or more facility servers 826. As described below, connection to the central processing system 840 and/or to the one or more facility servers 826 facilitates the platform 800.

The program memory 808 and/or the RAM 818 may store various applications for execution by the processing circuitry 816. For example, an application 832 may provide a user interface to the server, which user interface may, for example, allow a network administrator to configure, troubleshoot, or test various aspects of the server's operation, or otherwise to access information thereon. A server application 834 operates to populate and transmit web pages to the web-enabled devices 894, receive information from the user 892 transmitted back to the server 890, and forward appropriate data to the central processing system 840 and the facility servers 826, as described below. Like the software 871, the server application 834 may be a single module 834 or a number of modules 834a, 834b. While the server application 834 is depicted in FIG. 8D as including two modules, 834a and 834b, the server application 834 may include any number of modules accomplishing tasks related to implantation of the web server 890. By way of example, the module 834a may populate and transmit the web pages and/or may receive and evaluate inputs from the user 892 to facilitate in the wireless transfer of data from a first tablet to a second tablet, while the module 834b may communicate with one or more of the back end components to provide the requested data.

Typically, a user may launch or instantiate a user interface application (e.g., a web browser or other client application) from a web-enabled device, such as the web-enabled devices 833 and 894, to access the web server 890 cooperating with the system 840 to implement the platform 800.

One or more processors can be utilized to implement any functions and/or algorithms described herein, unless explicitly stated otherwise. Additionally, any functions and/or algorithms described herein, unless explicitly stated otherwise, can be performed upon virtual processing circuitry (e.g., one or more virtual processors, for example on one or more physical computing systems such as a computer farm or a cloud drive).

Reference has been made to flowchart illustrations and block diagrams of methods, systems and computer program products according to implementations of this disclosure. Aspects thereof are implemented by computer program instructions. These computer program instructions may be provided to processing circuitry of a general purpose computer, special purpose computer, or other programmable data processing apparatus to produce a machine, such that the instructions, which execute via the processing circuitry of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processing circuitry (e.g., processors and/or programmable circuits) configured to execute program code and/or computer instructions to execute the functions, processes and algorithms described herein. Additionally, some implementations may be performed on modules or hardware not identical to those described. Accordingly, other implementations are within the scope that may be claimed.

The invention claimed is:

1. A system comprising:
   processing circuitry; and
   a non-transitory computer readable memory coupled to the processing circuitry, the memory storing machine-executable instructions, wherein the machine-executable instructions, when executed on the processing circuitry, cause the processing circuitry to:
   receive, from a remote computing device of a user via a network, identification of at least one of a customer, a market, a product, and a geographic region for a new negotiation;
   identify, based upon the at least one of the customer, the market, the product, and the geographic region, a plurality of recommended template parameters;
   provide, in a user interface configured for display on a remote computing device, a quote customization user interface prioritizing presentation of the plurality of recommended template parameters;
   receive, from the remote computing device responsive to providing the quote customization user interface, a plurality of quote template fields selected by the user of the remote computing device;
   associate, within a non-transitory storage medium, the quote template fields with the at least one of the customer, the market, the product, and the geographic region;
   provide, in a second user interface configured for display on the remote computing device, a quote request template user interface comprising the plurality of quote template fields, wherein at least a portion of the quote template fields are editable by the user;
   receive, from the remote computing device responsive to providing the quote request template user interface, a plurality of quote request template parameter settings, wherein the plurality of quote request template parameter settings include one or more indications of a corresponding field being editable by a second party to the new negotiation; and
   cause presentation, in real time responsive to receiving the plurality of quote request template parameter settings, of a quote request available notification on at least one remote vendor computing device associated with each vendor of at least one vendor, wherein the quote request available notification presents, upon each remote vendor computing device of the at least one vendor, data corresponding to at least a portion of the quote request template parameter settings.

2. The system of claim 1, wherein the quote request available notification is configured, upon activation, to present upon each remote vendor computing device of the at least vendor, a respective interactive graphic display for quote consideration.

3. The system of claim 1, wherein the machine-executable instructions, when executed on the processing circuitry, further cause the processing circuitry to receive, from the remote computing device responsive to providing the quote customization user interface, identification of at least one document associated with the new negotiation.

4. The system of claim 1, wherein the machine-executable instructions, when executed on the processing circuitry, further cause the processing circuitry to store, in a non-transitory database storage region, an audit trail relating to the new negotiation.

5. The system of claim 1, wherein the machine-executable instructions, when executed on the processing circuitry, further cause the processing circuitry to, prior to causing presentation of the quote request available notification:
identify, based at least in part upon at least one of the customer, the market, the product, and the geographic region, a plurality of recommended vendors; and
present, in real time in the user interface configured for display on the remote computing device, an interactive graphic display of the plurality of recommended vendors for selection of the at least one vendor.

6. The system of claim 1, wherein prioritizing presentation of the plurality of recommended template parameters comprises presenting, in a selected template parameters region of the quote customization user interface, the plurality of recommended template parameters.

7. The system of claim 1, wherein:
receiving the plurality of quote template fields selected by the user comprises receiving a name for a customized template; and
the machine-executable instructions, when executed by the processing circuitry, further cause the processing circuitry to store, within a non-transitory computer readable medium, the plurality of quote template fields as a customized template of the name.

8. A method comprising:
receiving, via a network from a remote computing device, a request for a quote for a product;
providing, in a user interface configured for display on the remote computing device, a quote request template;
receiving, from the remote computing device responsive to providing the quote request template, a plurality of quote request template parameter settings, wherein the plurality of quote request template parameter settings include one or more indications of a respective corresponding field being editable by a third party to a negotiation regarding the quote;
accessing, by processing circuitry, quote template data related to a plurality of completed transactions;
identifying, by processing circuitry based upon at least a subset of the plurality of quote request template parameter settings and at least a portion of the plurality of completed transactions, a plurality of vendors;
providing, in real time in a user interface configured for display on the remote computing device, an interactive graphic display of the plurality of vendors for selection;
receiving, from the remote computing device responsive to providing the interactive graphic display, an indication of selection of at least one vendor of the plurality of vendors; and
providing, in real time responsive to the indication of selection, a quote request available notification to at least one remote vendor computing device associated with each vendor of the at least one vendor, wherein the quote request available notification is configured, upon activation, to present upon each remote vendor computing device of the at least one vendor a respective interactive graphic display for quote consideration, wherein
the interactive graphic display includes data corresponding to at least a portion of the quote request template parameter settings.

9. The method of claim 8, further comprising receiving, from a first remote vendor computing device of the at least one remote vendor computing device associated with a first vendor of the at least one vendor, customized quote details relating to the provided quote request, wherein at least a portion of the customized quote details correspond to a field identified by the user as editable.

10. The method of claim 9, wherein the customized quote details include data corresponding to one or more template parameter settings of the portion of the quote request template parameter settings.

11. The method of claim 10, wherein receiving the plurality of quote request template parameter settings comprises receiving, associated with the one or more template parameter settings of the portion of the quote request template parameter settings, an indication that the corresponding quote request template parameter setting is third party editable.

12. The method of claim 9, further comprising providing, to the remote computing device in real time responsive to receiving the customized quote details, a quote available notification.

13. The method of claim 9, further comprising storing, in a non-transitory computer readable database an audit trail relating to a negotiation transaction comprising the quote request and the customized quote details.

* * * * *